US011209098B2

(12) United States Patent
Wada

(10) Patent No.: US 11,209,098 B2
(45) Date of Patent: Dec. 28, 2021

(54) DEVICE FOR DETECTING FLUID FLOW

(71) Applicant: LUBE CORPORATION, Tokyo (JP)

(72) Inventor: Koichi Wada, Tokyo (JP)

(73) Assignee: LUBE CORPORATION, Tokyo (JP)

( * ) Notice: Subject to any disclaimer, the term of this patent is extended or adjusted under 35 U.S.C. 154(b) by 283 days.

(21) Appl. No.: 16/318,588

(22) PCT Filed: Jul. 18, 2017

(86) PCT No.: PCT/JP2017/025918
§ 371 (c)(1),
(2) Date: Jan. 17, 2019

(87) PCT Pub. No.: WO2018/016478
PCT Pub. Date: Jan. 25, 2018

(65) Prior Publication Data
US 2019/0242495 A1 Aug. 8, 2019

(30) Foreign Application Priority Data

Jul. 20, 2016 (JP) .............................. JP2016-142359
Sep. 26, 2016 (JP) .............................. JP2016-187037
(Continued)

(51) Int. Cl.
F16K 37/00 (2006.01)
F16N 29/00 (2006.01)
(Continued)

(52) U.S. Cl.
CPC ........ F16K 37/0058 (2013.01); F16K 15/021 (2013.01); F16K 15/026 (2013.01);
(Continued)

(58) Field of Classification Search
CPC .......... G01F 1/24; G01F 1/26; F16N 2250/40; F16N 29/00; F16K 37/0058;
(Continued)

(56) References Cited

U.S. PATENT DOCUMENTS 3,457,949 A * 7/1969 Coulter ................. F16K 15/026
137/543.21
3,644,915 A * 2/1972 McBurnett ........... B01D 35/147
340/607
(Continued)

FOREIGN PATENT DOCUMENTS

CN 201084644 Y 7/2008
CN 102840435 A 12/2012
(Continued)

OTHER PUBLICATIONS

Europe Patent Office, "Search Report for European Patent Application No. 17830994.4," dated Feb. 6, 2020.
(Continued)

Primary Examiner — Atif H Chaudry
(74) Attorney, Agent, or Firm — Manabu Kanesaka

(57) ABSTRACT

In a valve member, supply and discharge apertures of fluid are formed at a body having a fluid space E. A one electrode Da including a contact T is provided at an aperture edge of the supply aperture and/or a peripheral part of an aperture edge of the body. The body includes another electrode Db, and stores a valve member made of a conductor and opening and closing the supply aperture, and a coil spring made of a conductor and urges the valve member. A guide member made of a conductor is attached onto the valve member. The guide member is formed to secure a flow path of the fluid from the supply aperture to the discharge aperture while being slidable in the fluid space E, has a reception surface facing one end face of the fluid space E while receiving the fluid from the supply aperture.

22 Claims, 25 Drawing Sheets

(30) Foreign Application Priority Data

Nov. 14, 2016 (JP) .............................. JP2016-221215
Dec. 29, 2016 (JP) .............................. JP2016-257382

(51) Int. Cl.
  *F16K 15/06* (2006.01)
  *G01F 1/26* (2006.01)
  *G01F 1/24* (2006.01)
  *F16K 15/02* (2006.01)
  *F16N 7/38* (2006.01)
  *H01H 35/38* (2006.01)
  *F16N 25/00* (2006.01)
  *F16K 17/06* (2006.01)

(52) U.S. Cl.
  CPC ............ *F16K 15/063* (2013.01); *F16K 17/06* (2013.01); *F16K 37/005* (2013.01); *F16K 37/0033* (2013.01); *F16K 37/0041* (2013.01); *F16N 7/385* (2013.01); *F16N 25/00* (2013.01); *F16N 29/00* (2013.01); *G01F 1/24* (2013.01); *G01F 1/26* (2013.01); *H01H 35/38* (2013.01); *F16N 2250/40* (2013.01)

(58) Field of Classification Search
  CPC .. F16K 37/005; F16K 15/063; F16K 37/0041; F16K 15/026; F16K 15/021
  See application file for complete search history.

(56) References Cited

U.S. PATENT DOCUMENTS

| | | | |
|---|---|---|---|
| 4,341,241 A * | 7/1982 | Baker | ................ F16K 37/0041 137/554 |
| 8,786,455 B2 | 7/2014 | Perry et al. | |
| 9,494,947 B2 | 11/2016 | Hirata et al. | |
| 9,632,511 B2 | 4/2017 | Hirata et al. | |
| 9,870,006 B2 | 1/2018 | Hirata et al. | |
| 10,030,783 B2 | 7/2018 | Onishi et al. | |
| 10,386,861 B2 | 8/2019 | Hirata et al. | |
| 2003/0111326 A1 | 6/2003 | Ford | |
| 2009/0120515 A1 | 5/2009 | Ohtani et al. | |
| 2010/0084029 A1 | 4/2010 | Lin et al. | |
| 2012/0325321 A1 | 12/2012 | Perry et al. | |
| 2014/0182692 A1 | 7/2014 | Hirata et al. | |
| 2014/0230911 A1 | 8/2014 | Hirata et al. | |
| 2015/0219234 A1 | 8/2015 | Hobmeyr | |
| 2016/0131273 A1 | 5/2016 | Onishi et al. | |
| 2016/0180974 A1 | 6/2016 | Malloy, III | |
| 2016/0370808 A1 | 12/2016 | Hirata et al. | |
| 2017/0234455 A1 | 8/2017 | Hirata et al. | |

FOREIGN PATENT DOCUMENTS

| | | |
|---|---|---|
| CN | 204189708 U | 3/2015 |
| CN | 105422924 A | 3/2016 |
| CN | 105587904 A | 5/2016 |
| DE | 2042617 A1 | 3/1971 |
| EP | 0287289 A2 | 10/1988 |
| FR | 2376977 A1 | 8/1978 |
| JP | S53-016743 U | 2/1978 |
| JP | H02-140734 U | 11/1990 |
| JP | H02-144743 U | 12/1990 |
| JP | H03-283222 A | 12/1991 |
| JP | 3009191 U | 3/1995 |
| JP | 2003-203548 A | 7/2003 |
| RU | 2011116689 A | 11/2012 |
| TW | 200925475 A | 6/2009 |
| TW | I492014 B | 7/2015 |
| WO | 2016/085573 A1 | 6/2016 |

OTHER PUBLICATIONS

Russia Patent Office, "Office Action for Russian Patent Application No. 2019101215," dated Nov. 6, 2020.
PCT/ISA/210, "International Search Report for International Application No. PCT/JP2017/025918," dated Oct. 24, 2017.
PCT/IB/338, "Notification of Transmittal of Translation of the International Preliminary Report on Patentability tor International Application No. PCT/JP2017/025918," dated Jan. 31, 2019.
PCT/IB/373, "International Preliminary Report on Patentability for International Application No. PCT/JP2017/025918," dated Jan. 22, 2019.
PCT/ISA/237, "Written Opinion of the International Searching Authority for International Application No. PCT/JP2017/025918," dated Oct. 24, 2017.
China Patent Office, "Office Action for Chinese Patent Application No. 201780042922.0," dated Nov. 22, 2019.
Taiwan Patent Office, "Office Action for Taiwanese Patent Application No. 106124323," dated Jun. 7, 2021.

* cited by examiner

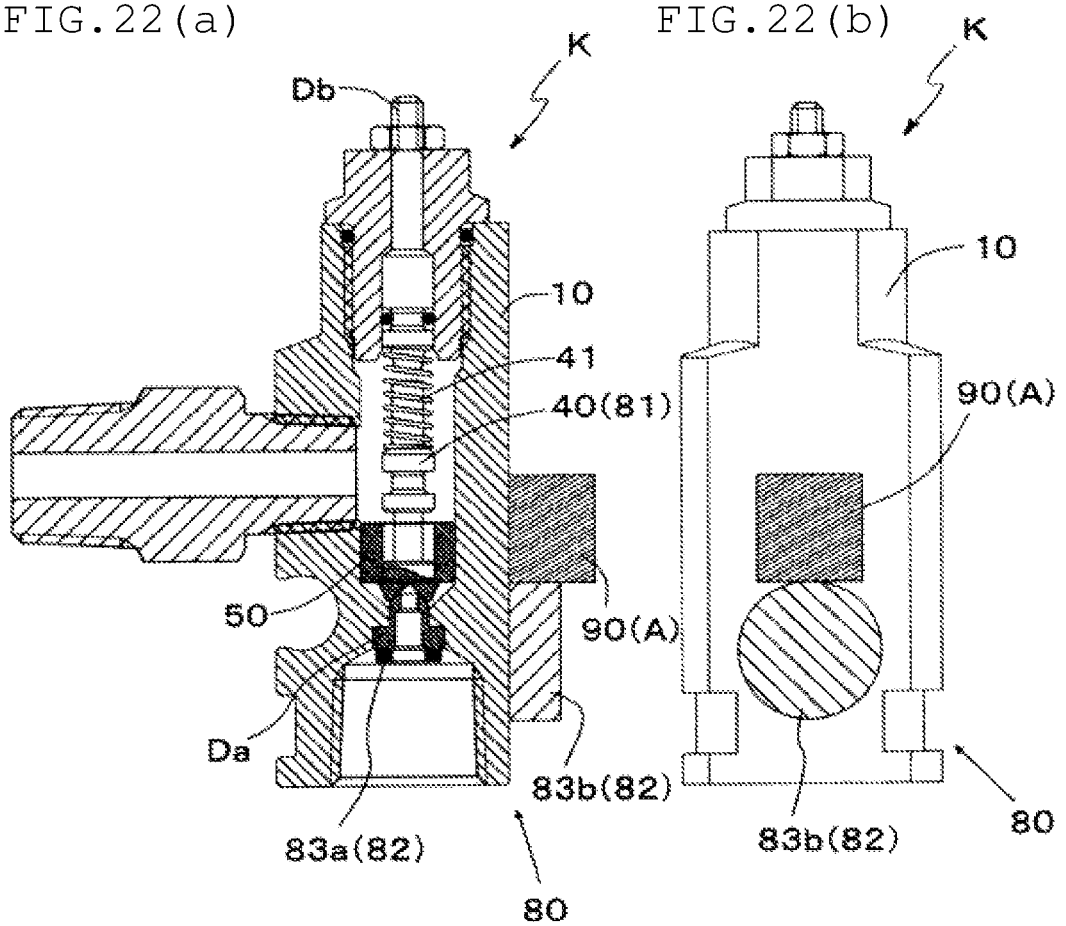

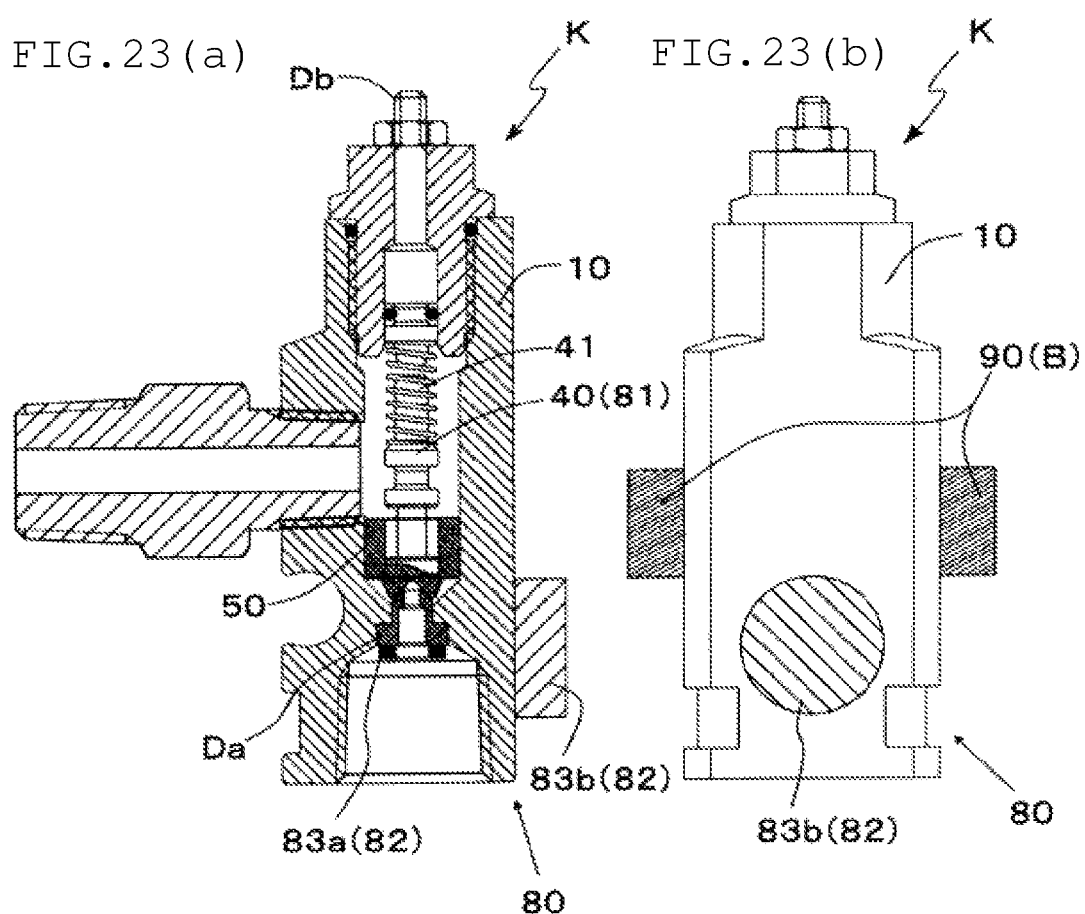

DEVICE FOR DETECTING FLUID FLOW

RELATED APPLICATIONS

The present application is National Phase of International Application No. PCT/JP2017/025918 filed Jul. 18, 2017, and claim priorities from Japanese Application No. 2016-142359, filed Jul. 20, 2016; No. 2016-187037, filed Sep. 26, 2016; No. 2016-221215, filed Nov. 14, 2016; and No. 2016-257382, filed Dec. 29, 2016, the disclosure of which is hereby incorporated by reference herein in its entirety.

TECHNICAL FIELD

The invention relates to, for example, a device for detecting fluid flow, the device detecting the flow of fluid made up of a lubricant, such as grease or oil, flowing through a pipeline of a lubrication system provided for an industrial machine, such as an injection molding machine, a machine tool or the like, and in particular, a device for detecting fluid flow, the device allowing the flow of fluid to be detected by sensing opening and closing of an inner valve member.

BACKGROUND ART

Conventionally, as this type of the device for detecting fluid flow, for example, what is disclosed in Japanese Utility Model Laid-Open No. S53-16743 has been known. As shown in FIG. 25, this device Ka for detecting fluid flow includes a body 100 made up of an insulator including a fluid space E having a cylindrical inner surface allowing fluid to pass therethrough, and is configured such that a fluid supply port 102 having a supply aperture 101 centered on the central axis P of the fluid space E is formed at one end of the fluid space E in this body 100, a fluid discharge port 104 having a discharge aperture 103 communicating with the fluid space E is formed on a side of the body 100, a formation member of the supply aperture 101 forming the supply aperture 101 is configured as one electrode 105 made up of a conductor, the body 100 is provided with another electrode 107 that includes an exposure part 106 exposed on the other side of the fluid space E and is made up of a conductor insulated from the one electrode 105, a valve member 110 which is made up of a conductor is stored in the fluid space E, the valve member 110 being moved along the central axis P of the fluid space E to come into contact with an aperture edge 108 of the supply aperture 101 and close the supply aperture 101 and to be apart from the supply aperture 101 and open the supply aperture 101, and a coil spring 111 which is made up of a conductor, whose one end is connected to the valve member 110, whose other end is connected to the exposure part 106 of the other electrode 107, and which always urges the valve member 110 in a direction of closing the supply aperture 101, is stored in the fluid space E. A cylindrical guide member 114 is fixed to the other electrode 107; the guide member 114 has a slide hole 113 whose axis is on the axis line along the central axis P of the fluid space E, in which the valve member 110 having a protruding distal end 112 is slidably inserted, and which stores the coil spring 111. The device Ka for detecting fluid flow constitutes what is called a check valve by opening and closing the valve member 110.

The flow detecting device Ka is connected to a detector, not shown, via wiring 115 connected to the one electrode 105 and via wiring 116 connected to the other electrode 107. This detector always applies a voltage to an electric circuit that includes the one electrode 105, the valve member 110, the coil spring 111 and the other electrode 107, and electrically senses connection when the valve member 110 of the electric circuit is closed and disconnection when this member is opened, thereby sensing the flow of the fluid.

CITATION LIST

Patent Literature

[Patent Literature 1] Japanese Utility Model Laid-Open No. S53-16743

SUMMARY OF INVENTION

Technical Problem

Unfortunately, according to the conventional device Ka for detecting fluid flow described above, for example, a lubrication system that includes a quantitative valve for discharging lubricant as fluid by a small amount, e.g., about 0.005 to 1 cc one time toward a lubrication site, has a problem in that the reliability of detecting the flow of lubricant is low in a case where this device is connected to a lubrication pipe from the quantitative valve to the lubrication site, detects the flow of the lubricant, and intends to perceive whether the lubricant is securely supplied or not.

This is because supply of fluid from the supply port 102 causes the valve member 110 to move against the urging force of the coil spring 111, come apart from the supply aperture 101 to open this aperture and disconnect the electric circuit, but when the flow rate of the fluid is relatively low, specifically, for example, when the flow rate is significantly low, i.e., 0.1 cc or less, or even when the flow rate of the fluid is relatively high but, for example, the flow velocity is low under situations or the like of a large number of quantitative valves in use, the amount of movement (lifting amount) of the valve member 110 is significantly small, and there are therefore some cases where even with a flow of fluid, the distal end 108 of the valve member 110 does not completely come apart from the one electrode 105 and a part thereof maintains the contact state, and opening (disconnection) cannot be detected. If the urging force of the coil spring 111 is reduced in order to address this problem, the returning operation of the valve member 110 is degraded, thereby causing an adverse effect.

The invention has been made in view of the above problem, and has an object to provide a flow detecting device that allows a valve member to be securely separated from a supply aperture even with a low fluid flow rate, without adversely affecting the returning operation of the valve member, thereby facilitating improvement of the reliability of flow detection.

Solution to Problem

To achieve such an object, a device for detecting fluid flow in the invention is a device for detecting fluid flow, including a body having a fluid space that allows fluid to pass therethrough and has a cylindrical inner surface, wherein the body is provided with a fluid supply port that has a supply aperture centered on a central axis of the fluid space and is formed at one end of the fluid space, the body is provided with a fluid discharge port that has a discharge aperture communicating with the fluid space, a valve member is stored in the fluid space, the valve member being moved along the central axis of the fluid space, closing the supply aperture, and coming apart from the supply aperture to open the supply aperture, a coil spring is stored in the fluid space, the coil spring always urging the valve member in a direction of closing the supply aperture, and the device being capable of detecting the fluid flow by sensing opening and closing of the valve member.

A guide member is attached onto the valve member, the guide member being formed to secure a flow path of the fluid from the supply aperture to the discharge aperture while being slidable on a cylindrical inner surface of the fluid space, the guide member having a reception surface facing one end face of the fluid space while receiving the fluid from the supply aperture, and having a top surface facing another end face of the fluid space.

In a case where the flow detecting device is used, the supply port and the discharge port are connected to a pipeline through which the fluid flows therethrough, and when the fluid is supplied through the supply port, opening and closing of the valve member is sensed, thereby detecting fluid flow. That is, when the fluid is supplied through the supply port, the fluid flows into the fluid space through the supply aperture, the fluid is applied onto the valve member and the reception surface of the guide member accompanying the valve member, and the guide member slides on the cylindrical inner surface of the fluid space. Accordingly, the valve member and the guide member are integrally pushed above, thereby opening the valve member. In this case, the fluid is received also by the reception surface of the guide member. Accordingly, the valve member easily floats. Consequently, the valve member can be securely apart from the supply aperture. For example, when the flow rate of the fluid is relatively low, specifically, for example, when the flow rate is significantly low, i.e., 0.1 cc or less, or even when the flow rate of the fluid is relatively high but the flow velocity is low, the amount of movement (lifting amount) of the valve member is significantly small. However, the valve member is securely pushed upward by floating of the guide member. Accordingly, the valve member can securely come apart from the supply aperture. Consequently, even though the fluid flows as in the conventional art, a situation can be prevented where the valve member does not entirely come apart from the supply aperture and a part thereof is maintained to be in contact and opening cannot be detected. The detection reliability can be improved. The guide member slides on the cylindrical inner surface of the fluid space while securing the fluid flow path from the supply aperture to the discharge aperture, thereby allowing the fluid to be introduced from the discharge aperture to the discharge port. On the other hand, when the supply of the fluid through the supply port is stopped, the valve member and the guide member are moved toward the one end face of the fluid space by the urging force of the coil spring, and the valve member closes the supply aperture. In this case, in the guide member, the fluid flow path is secured from the supply aperture to the discharge aperture. Consequently, the returning operation of the valve member is not obstructed.

As required, the valve member is formed to have a rod shape that includes a distal end capable of blocking the supply aperture, and has an axis on an axis line along the central axis of the fluid space.

The guide member has an insertion hole which has an axis on the axis line along the central axis of the fluid space and into which the valve member is inserted therethrough with the distal end protruding therefrom, a narrow part is formed on an outer periphery of an intermediate part of the guide member, the narrow part allowing the fluid to pass therethrough, a part of the guide member close to the one end face of the fluid space is configured to be a one-end slider that includes the reception surface, and includes a one-end slide surface slidable on the cylindrical inner surface of the fluid space, a part of the guide member close to the other end face of the fluid space is configured to be another-end slider that includes the top surface, and includes another-end slide surface slidable on the cylindrical inner surface of the fluid space, a one-end notch is formed on an outer side of the one-end slider, the one-end notch ranging between the reception surface and the narrow part and allowing the fluid to pass therethrough, and another-end notch is formed on an outer side of the other-end slider, the other-end notch ranging between the top surface and the narrow part and allowing the fluid to pass therethrough.

Accordingly, the valve member is inserted into the insertion hole of the guide member, thereby integrating these members. Consequently, production is facilitated. When the valve member and the guide member are pushed upward by the fluid, the fluid passes through the one-end notch and the narrow part and reaches the discharge aperture, and is discharged through the discharge port. In this case, the narrow part is provided. Accordingly, the resistance against the fluid is reduced. Consequently, the fluid can be securely guided through the supply aperture to the discharge aperture. The guide member includes the one-end slider and the other-end slider at the opposite ends between which the narrow part intervenes. Consequently, inclination due to the fluid flow can be prevented. Furthermore, the fluid can flow through the other end notch. Consequently, the guide member can be slidably moved smoothly when the valve member is opened and closed. Accordingly, when the valve member is opened, the valve member can easily float upward. When the valve member is closed, the supply aperture can be securely closed.

As further required, a plurality of the one-end notches are provided, the one-end notches are each formed to have an identical size and have an identical shape, and are arranged about the axis line at regular angular intervals, a plurality of the other end notches are provided, and the other-end notches are each formed to have an identical size and have an identical shape, and are arranged about the axis line at regular angular intervals.

The notches are each formed to have the same size and shape, and are provided at regular angular intervals. Consequently, the fluid flow becomes uniform. Accordingly, when the valve member is opened, the fluid can be securely introduced, while smoothly moving the valve member and the guide member. When the valve member is closed, the supply aperture can be securely closed.

As further required, the insertion hole is formed in the guide member to penetrate therethrough, the valve member is configured to have a large-diameter part fitted onto the insertion hole, and a small-diameter part formed to be narrower than the large-diameter part, and a plurality of communication paths communicating with the insertion hole are formed at sites of the guide member, the sites corresponding to the small-diameter part of the valve member and at least being at any of the narrow part, the one-end notches, and the other end notches.

Since the fluid enters the communication path, the resistance against the fluid is reduced accordingly. Consequently, the fluid can easily flow. Accordingly, when the valve member is opened, the fluid can be securely introduced, while smoothly moving the valve member and the guide member. When the valve member is closed, the supply aperture can be securely closed.

In this case, the small-diameter part is provided close to a rear end of the valve member, and one end of the coil spring is stored in the insertion hole, and the plurality of communication paths are formed at sites of the guide member where the narrow part and/or the other end notch of the guide member reside. This configuration is effective.

The one end of the coil spring is stored in the insertion hole. Consequently, the holding becomes stable. Also in this point, the valve member and the guide member can be smoothly moved.

In this case, preferably, the large-diameter part of the valve member is provided at a middle of the valve member, the small-diameter part is provided between the distal end and the large-diameter part of the valve member, and the plurality of communication paths are formed at sites of the guide member that correspond to the small-diameter part and are the narrow part and/or the one-end notch.

The communication path is formed also at the distal end of the valve member in addition to the rear end of the valve member. Consequently, the resistance against the fluid is reduced accordingly, thereby facilitating fluid flow. Accordingly, when the valve member is opened, the fluid can be further securely introduced, while further smoothly moving the valve member and the guide member. When the valve member is closed, the supply aperture can be further securely closed.

Furthermore, in this case, preferably, an O-ring is arranged around the large-diameter part, the O-ring being elastically in contact with the inner surface of the insertion hole, and the large-diameter part is fitted into the insertion hole via the O-ring. The fitting is achieved by the O-ring. Consequently, the valve member can be easily fitted to the guide member.

Furthermore, in the invention, a groove-shaped groove path is formed on a peripheral surface of the guide member, the groove path having an inlet port at a part of the guide member closer to the one end face of the fluid space, and an outlet port at a part of the guide member closer to the other end face of the fluid space, the groove path being along a circumferential direction and allowing the fluid to pass therealong. This configuration is effective.

This type is specifically suitable to a case where the fluid has a low viscosity. The groove path is provided along the circumferential direction of the guide member. Consequently, the resistance against fluid passage is increased. The valve member can easily float upward accordingly. The viscosity is low. Accordingly, the fluid flow can be secured. The fluid passes along the circumferential direction of the guide member. Consequently, every time the guide member slides on the cylindrical inner surface of the fluid space, the peripheral surface of the guide member can easily come into contact with new fluid. For example, in a case where the fluid is grease or the like, the adverse possibility of fixation can be eliminated.

Furthermore, as required, the valve member is configured to include a distal end capable of blocking the supply aperture, and the distal end is configured to include a depression part facing the supply aperture and being depressed inward.

In this case, the depression part may be formed to have a conical shape having an axis on the axis line along the central axis of the fluid space.

Accordingly, the depression part depressed inward is formed at the distal end. Consequently, the fluid flowing through the supply aperture rebounds by the depression part and becomes difficult to escape outward, and the fluid can be easily received. Consequently, the valve member can further easily float upward. Accordingly, the valve member can securely come apart from the supply aperture, and the detection reliability can be improved.

When the valve member is returned, the aperture edge of the depression part has an acute angle. Consequently, the effect of sharing the fluid occurs, and the closing operation can be smoothly performed accordingly.

As required, an aperture edge of the supply aperture is formed to protrude into the fluid space so that the aperture edge can face an inside of the depression part when the supply aperture of the valve member is blocked.

Such a configuration can cause the fluid to flow intensively into the depression part of the valve member. Accordingly, the fluid can be further easily received, and the valve member can easily float. Consequently, the valve member can securely come apart from the supply aperture. Furthermore, the diameter of the supply aperture is smaller than the diameter of the aperture of the depression part. Consequently, the flow velocity can be increased in comparison with a case where the diameter of the supply aperture is substantially identical to the diameter of the aperture of the depression part. Therefore, also in this point, the valve member can easily float, and the valve member can securely come apart from the supply aperture.

Furthermore, to solve the above problem, a device for detecting fluid flow of the invention, includes a body having a fluid space that allows fluid to pass therethrough and has a cylindrical inner surface, wherein the body is provided with a fluid supply port that has a supply aperture centered on a central axis of the fluid space and is formed at one end of the fluid space, the body is provided with a fluid discharge port that has a discharge aperture communicating with the fluid space, a valve member is stored in the fluid space, the valve member being moved along the central axis of the fluid space, closing the supply aperture, and coming apart from the supply aperture to open the supply aperture, a coil spring is stored in the fluid space, the coil spring always urging the valve member in a direction of closing the supply aperture, and the device being capable of detecting the fluid flow by sensing opening and closing of the valve member.

The valve member is configured to include a distal end capable of blocking the supply aperture, and the distal end is configured to include a depression part facing the supply aperture and being depressed inward.

A guide member is provided in the fluid space, the guide member securing a flow path of the fluid from the supply aperture to the discharge aperture while slidably guiding the valve member.

In a case where the flow detecting device is used, the supply port and the discharge port are connected to a pipeline through which the fluid flows therethrough, and when the fluid is supplied through the supply port, opening and closing of the valve member is sensed, thereby detecting fluid flow. That is, when the fluid is supplied through the supply port, the fluid flows through the supply aperture into the fluid space, the fluid is applied onto the valve member, and the valve member slides on the guide member to open the valve member. In this case, the depression part depressed inward is formed at the distal end of the valve member. Accordingly, the fluid flowing through the supply aperture rebounds by the depression part and becomes difficult to escape outward, and the fluid can be easily received. Consequently, the valve member can further easily float upward. Therefore, the valve member can securely come apart from the supply aperture. For example, when the fluid flow rate is relatively low, specifically, when the flow rate is significantly low, i.e. 0.1 cc or less, or when the fluid flow rate is relatively high but the flow velocity is low, the amount of movement (lifting amount) of the valve member becomes significantly small but the valve member is securely pushed upward, thereby allowing the valve member to be securely apart from the supply aperture. Consequently, the detection reliability can be improved. On the other hand, when the supply of the fluid through the supply port is stopped, the valve member slides on the guide member and is moved toward the one end face of the fluid space by the urging force of the coil spring, and the valve member closes the supply aperture. In this case, the fluid flow path is secured from the supply aperture to the discharge aperture. Consequently, the returning operation of the valve member is not obstructed.

When the valve member is returned, the aperture edge of the depression part has an acute angle. Consequently, the effect of sharing the fluid occurs, and the closing operation can be smoothly performed accordingly.

In this case, the depression part may be formed to have a conical shape having an axis on the axis line along the central axis of the fluid space.

Furthermore, in this case, as required, an aperture edge of the supply aperture is formed to protrude into the fluid space so that the aperture edge can face an inside of the depression part when the supply aperture of the valve member is blocked.

Such a configuration can cause the fluid to flow intensively into the depression part of the valve member. Accordingly, the fluid can be further easily received, and the valve member can easily float. Consequently, the valve member can securely come apart from the supply aperture. Furthermore, the diameter of the supply aperture is smaller than the diameter of the aperture of the depression part. Consequently, the flow velocity can be increased in comparison with a case where the diameter of the supply aperture is substantially identical to the diameter of the aperture of the depression part. Therefore, also in this point, the valve member can easily float, and the valve member can securely come apart from the supply aperture.

Furthermore, to solve the above problem, a device for detecting fluid flow of the invention, includes a body having a fluid space that allows fluid to pass therethrough and has a cylindrical inner surface, wherein the body is provided with a fluid supply port that has a supply aperture centered on a central axis of the fluid space and is formed at one end of the fluid space, the body is provided with a fluid discharge port that has a discharge aperture communicating with the fluid space, a valve member is stored in the fluid space, the valve member being moved along the central axis of the fluid space, closing the supply aperture, and coming apart from the supply aperture to open the supply aperture, and a coil spring is stored in the fluid space, the coil spring always urging the valve member in a direction of closing the supply aperture, and the device being capable of detecting the fluid flow by sensing opening and closing of the valve member.

The device further includes an attracting member that permits an operation of opening the valve member due to the fluid supplied through the supply aperture, and attracts the valve member toward the supply aperture owing to a magnetic force.

In a case where the flow detecting device is used, the supply port and the discharge port are connected to a pipeline through which the fluid flows therethrough, and when the fluid is supplied through the supply port, opening and closing of the valve member is sensed, thereby detecting fluid flow. That is, when the fluid is supplied through the supply port, the fluid flows through the supply aperture into the fluid space, and the valve member is pushed upward to open the valve member. In this case, as the attraction of the magnetic force by the attracting member is inversely proportional to the square of the distance, the attracting force is weak during movement of the valve member from the closed position to the open position. Accordingly, the valve member can easily float upward. Consequently, the valve member can securely come apart from the supply aperture. For example, when the fluid flow rate is relatively low, specifically, when the flow rate is significantly low, i.e. 0.1 cc or less, or when the fluid flow rate is relatively high but the flow velocity is low, the amount of movement (lifting amount) of the valve member becomes significantly small but the valve member is securely pushed upward, thereby allowing the valve member to be securely apart from the supply aperture. Consequently, the detection reliability can be improved. On the other hand, when the supply of the fluid through the supply port is stopped, the valve member is moved toward the one end face of the fluid space by the urging force of the coil spring, and the valve member closes the supply aperture. In this case, since the coil spring has a proportional relationship between the amount of deflection and the load, the returning characteristics of the valve member from the open position to the closed position, and the pressing force to the supply aperture are limited. However, the attraction of the magnetic force by the attracting member is inversely proportional to the square of the distance. Consequently, the returning characteristics of the valve member from the open position to the closed position can be improved, and the pressing force to the supply aperture can be improved, thereby allowing the contact with the aperture to be securely held. That is, only with the coil spring, the contact is difficult to be securely closed because the contact returns in a weakly covering manner; this is also due to the inner pressure. However, during attraction by the magnetic force, the attracting force is increased in inversely proportional to the square of the distance. Accordingly, an acceleration occurs, an insulation film (oil film) on the upper surface of the contact is broken, and an effect of cleaning the contact also occurs. Consequently, the contact can be securely closed. In consideration of the balance with the coil spring, the attracting force by the attracting member is adjusted by the material and size of the permanent magnet, the magnetic permeability of the valve member, the distance between the valve member and the permanent magnet and the like.

In this configuration, preferably, the attracting member includes: a first member that is provided at the valve member, and is made up of a magnet or a magnetically attachable material magnetically attachable to a magnet; and a second member that is provided around the supply aperture and attracts the first member, the second member being made up of a magnet or a magnetically attachable material magnetically attachable to a magnet.

That is, in a case where a magnet is provided for the valve member, a magnet and/or a magnetically attachable material is provided for the supply aperture. In a case where a magnetically attachable material is provided for the valve member, a magnet is provided for the supply aperture. The magnet may be any of a permanent magnet and an electromagnet. However, it is desirable to use a permanent magnet because the size can be compact. The magnetic force can be securely applied, and the valve member can be attracted.

Furthermore, as required, the second member is configured to include a plurality of permanent magnets having N-pole surfaces and S-pole surfaces.

As the plurality of permanent magnets are used, the synergy can facilitate adjustment of the attracting force, and adjustment of the balance with the coil spring. As the plurality of magnets are provided, the effective range of the magnetic forces and the magnetic lines of the magnets can be adjusted. Consequently, fluids having various types of properties can be detected.

Furthermore, as required, in the second member, at least one permanent magnet is disposed so as to have a magnetic pole direction being along the central axis of the fluid space, and at least another permanent magnet is disposed so as to have a magnetic pole direction being along a direction orthogonal to the central axis of the fluid space.

For example, the arrangement of the magnets allows the magnetic line of a specific one magnet to be captured by the other magnets, which can reduce the effective range (the magnetic field) of the attraction of the specific one magnet to the valve member. Consequently, even with a slight lifting amount of the valve member, the force of attracting the valve member by the specific one magnet can be reduced, and the valve member can be easily, securely opened. The magnetic force and arrangement of each magnet are adjusted, thereby allowing the lifting amount and lifting time (opening time) of the valve member to be adjusted. While the valve member is closed, the valve member can be securely closed by the attracting force of the magnets.

In this case, the first member may be made up of the valve member, and the second member may be attached to the body. The structure can be simplified.

Furthermore, in this case, a guide member is attached onto the valve member, the guide member being formed to secure a flow path of the fluid from the supply aperture to the discharge aperture while being slidable on a cylindrical inner surface of the fluid space, the guide member having a reception surface facing one end face of the fluid space while receiving the fluid from the supply aperture, and having a top surface facing another end face of the fluid space, the first member is made up of a coil that is made of a magnetically attachable material and is wound around the guide member, and the second member is made up of a magnet attached to the body.

The coil wound around the guide member is attracted, thereby allowing the valve member to be indirectly attracted.

In the invention, the device includes the body having the fluid space that allows the fluid to pass therethrough and has the cylindrical inner surface, the body is provided with the fluid supply port that has the supply aperture centered on the central axis of the fluid space and is formed at the one end of the fluid space, the body is provided with the fluid discharge port that has the discharge aperture communicating with the fluid space, the body is provided with one electrode that is made up of a conductor and has a contact exposed at one end of the fluid space, the body is provided with another electrode that is made up of a conductor, has an exposure part exposed at another end of the fluid space, and is insulated from the one electrode, a valve member made up of a conductor is stored in the fluid space, the valve member being moved along the central axis of the fluid space, coming into contact with the contact of the one electrode to close the supply aperture, and coming apart from the contact to open the supply aperture, a coil spring made up of a conductor is stored in the fluid space, and the coil spring being connected to the valve member at one end while being connected to the exposure part of the other electrode at the other end, and always urging the valve member in the direction of closing the supply aperture.

The fluid flow is allowed to be detected by electrically sensing connection when the valve member is closed and disconnection when this member is opened in an electric circuit that includes the one electrode, the valve member, the coil spring, and the other electrode.

In a case where the flow detecting device is used, the supply port and the discharge port are connected to the pipeline, through which the fluid to flow, and wiring from the detector is connected to the one electrode and the other electrode. This detector always applies a voltage to an electric circuit that includes the one electrode, the valve member, the coil spring and the other electrode, and electrically senses connection when the valve member of the electric circuit is closed and disconnection when this member is opened. That is, when the fluid is supplied through the supply port, the fluid flows through the supply aperture into the fluid space, the fluid is applied onto the valve member, and the valve member is integrally pushed upward to open the valve member. In this case, as described above, the valve member easily floats. Consequently, the valve member can be securely apart from the supply aperture. For example, when the fluid flow rate is relatively low, specifically, when the flow rate is significantly low, i.e. 0.1 cc or less, or when the fluid flow rate is relatively high but the flow velocity is low, the amount of movement (lifting amount) of the valve member becomes significantly small but the valve member is securely pushed upward, thereby allowing the valve member to be securely apart from the one electrode where the supply aperture resides. Consequently, even though the fluid flows as in the conventional art, a situation can be prevented where the valve member does not entirely come apart from the one electrode and a part thereof is maintained to be in contact and opening (disconnection) cannot be detected. The detection reliability can be improved. The reliability of electrical detection can be improved.

In this case, the contact of the one electrode is provided at an aperture edge of the supply aperture and/or a peripheral part of the aperture edge, and the valve member is formed to have a rod shape that includes a distal end capable of coming into contact with the contact to block the supply aperture, and has an axis on an axis line along the central axis of the fluid space. This configuration is effective. Contact with the contact can be secured.

Furthermore, in this configuration, as required, the other electrode has an axis on the axis line along the central axis of the fluid space, has one end formed as an exposure part exposed on the other end face of the fluid space, and has another end formed to have a rod shape formed as a connection part protruding from the body, the body is provided with a holding member that is made up of an insulator and holds the other electrode, and the holding member is provided with a holding hole which has an axis on the axis line along the central axis of the fluid space, and which the exposure part of the other electrode internally face, and which stores the other end of a coil spring, and holds the connection part while allowing this connection part to protrude.

Accordingly, the other end of the coil spring is stored in the holding hole. Consequently, the holding becomes stable, and the valve member can be smoothly moved.

In this case, the holding member is detachably attached to the body. This configuration is effective. When the holding member is removed, the fluid space of the body is opened. Consequently, the valve member and the coil spring can be easily assembled.

Furthermore, as required, the other electrode has an axis on an axis line orthogonal to the central axis of the fluid space, has an exposure part exposed on the other end of the fluid space, and has an end formed to have a rod shape formed as a connection part protruding from the body, the body is provided with a holding member that is made up of an insulator and holds the other electrode, and the connection part of the other electrode is provided with a connection part of the one electrode in a state of being insulated from the connection part of the other electrode.

Consequently, the one electrode and the other electrode can be provided on the side of the body in an aggregated manner, and the device can be compact accordingly. Both the connection parts can be easily protected by molding these parts with insulative resin or the like.

In this configuration, the exposure part is formed to include a spherical part with which an end of the coil spring is contact. This configuration is effective. Since the other electrode is arranged across the fluid space, the other electrode rotates about an axis on the axis line orthogonal to the central axis of the fluid space during fixation of the other electrode to the body, and the contact is changed with respect to the spring. However, the spring is brought into contact with the spherical part. Accordingly, the coil spring can be always brought into contact with the spherical surface even when the other electrode is rotated, the need to adjust the position of the other electrode is negated to facilitate assembly, and the stability of the contact can be achieved.

Furthermore, as required, a holding rod that holds the body, can be relatively rotated about an axis on an axis line orthogonal to the central axis of the fluid space, and can be locked at a required rotation position, is provided for the body outer than the other electrode in a penetrating manner, and the discharge port is formed in the holding rod.

Accordingly, the angle of the holding rod can be adjusted relatively to the body. When the holding rod having the discharge port is attached at the lubrication site, locking of the holding rod can be released and this rod can be attached, and subsequently this rod can be locked. In this case, even when the holding rod is rotated, the body can be constantly positioned at a certain position. Consequently, the flexibility of attachment at a narrow space is improved, which can facilitate the attachment.

Furthermore, as required, the discharge port is formed in the body in a manner allowing the one end of the other electrode to be movably inserted therein, and the body is provided with a support member that is made up of an insulator, and holds the end of the other electrode while securing a flow path of the fluid.

Accordingly, the discharge port is formed at a site where the one end of the other electrode resides. Consequently, in comparison with a case where the discharge port is provided outer than the other electrode, the device can be formed compact, and the flexibility of attachment at a narrow space can be improved.

Furthermore, as required, the discharge port is formed to have a discharge aperture centered on the central axis of the fluid space, at the other end of the fluid space.

The supply port and the discharge port can be provided on the central axis of the fluid space. Consequently, the body can be used in a straightened manner, and the attaching versatility can be improved.

Furthermore, in the invention, the body may be additionally provided with a photosensor that senses opening and closing of the valve member, and the fluid flow can be detected by the photosensor. In optical sensing, the reliability can be improved.

Furthermore, in the invention, the body may be additionally provided with an image sensor that senses opening and closing of the valve member, and the fluid flow can be detected by the image sensor. In image sensing, the reliability can be improved.

Advantageous Effects of Invention

As described above, the device for detecting fluid flow of the invention can easily receive the fluid flowing through the supply aperture and allow the valve member to easily float. Consequently, the valve member can be securely separated from the supply aperture without affecting the returning operation of the valve member. For example, when the fluid flow rate is relatively low, specifically, when the flow rate is significantly low, i.e. 0.1 cc or less, or when the fluid flow rate is relatively high but the flow velocity is low, the amount of movement (lifting amount) of the valve member becomes significantly small but the valve member is securely pushed upward, thereby allowing the valve member to be securely apart from the supply aperture. Consequently, significant effectiveness is achieved. As a result, the detection reliability can be improved.

BRIEF DESCRIPTION OF DRAWINGS

FIG. 7(a) is a plan view, FIG. 7(b) is a front view, FIG. 7(c) is a bottom view, and FIG. 7(d) is a side view.

FIG. 13(a) is a sectional view, and FIG. 13(b) shows an arrangement state of a permanent magnet.

FIG. 16(a) is a perspective view showing a connection part of aggregated electrodes in an exposed state, and FIG. 16(b) is a perspective view showing the connection part of the aggregated electrodes in a covered state.

FIG. 18(a) a perspective view of an illustration with the valve member, FIG. 18(b) is another perspective view, FIG. 18(c) is a plan view, FIG. 18(d) is a left side view, FIG. 18(e) is a right side view FIG. 18(f) is a front view, and FIG. 18(g) is a front sectional view.

FIG. 19(a) is a perspective view showing a connection part of aggregated electrodes in an exposed state, and FIG. 19(b) is a perspective view showing the connection part of the aggregated electrodes in a covered state.

FIGS. 22(a) and 22(b) show a device for detecting fluid flow where a reflective photosensor is mounted, according to still another embodiment of the invention; FIG. 22(a) is a sectional view, and FIG. 22(b) is a side view.

FIGS. 23(a) and 23(b) show a device for detecting fluid flow where a transmissive photosensor is mounted, according to still another embodiment of the invention; FIG. 23(a) is a sectional view, and FIG. 23(b) is a side view.

FIG. 24(a) is a sectional view showing a state of being attached to a valve member, FIG. 24(b) is a plan view showing an example of the shape, and FIG. 24(c) is a plan view showing another example of the shape.

DESCRIPTION OF EMBODIMENTS

Figure 1:
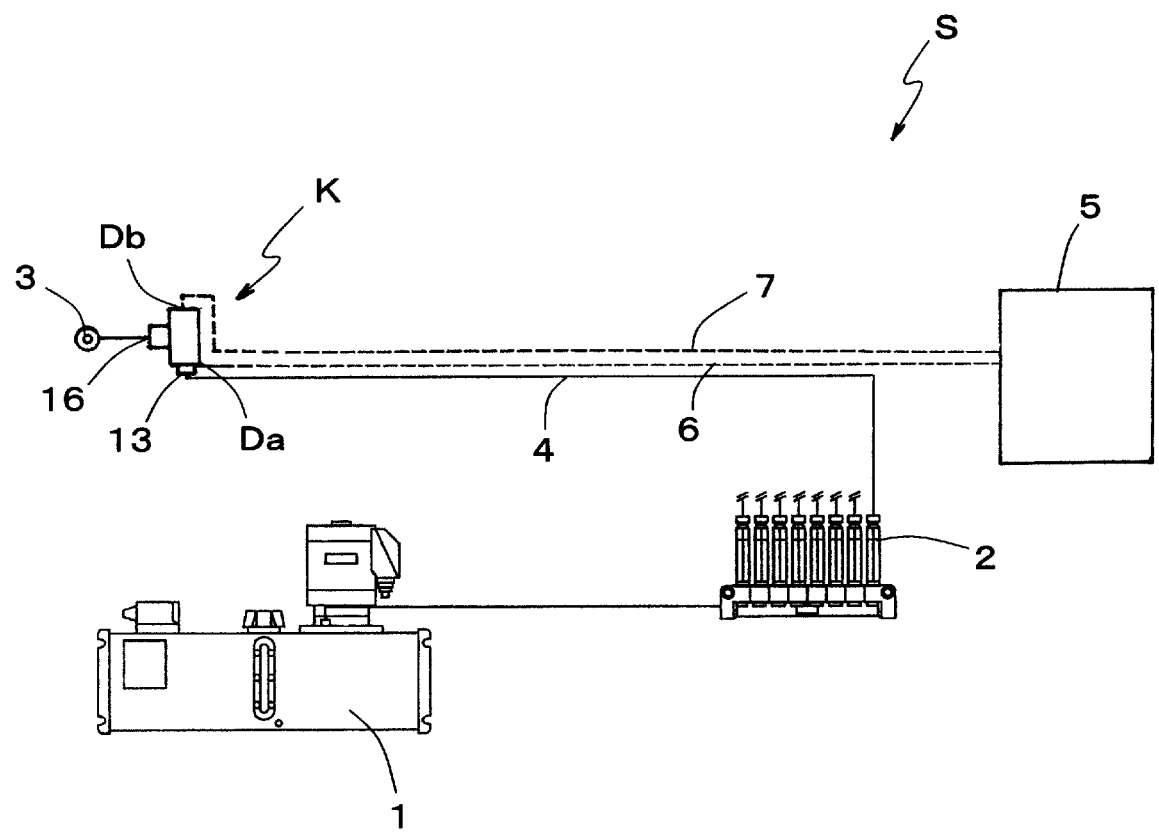
FIG. 1 shows an example of a lubrication system that includes a device for detecting fluid flow according to an embodiment of the invention.

Hereinafter, referring to the accompanying drawings, a device for detecting fluid flow according to an embodiment of the invention is described. As shown in FIG. 1, a device K for detecting fluid flow according to the embodiment is used for a lubrication system S provided for an industrial machine, such as an injection molding machine, a machine tool and the like. For example, the lubrication system S, in which a quantitative valve 2 operated by applying and reducing the fluid pressure is connected to a lubricant pump apparatus 1 for feeding a fluid made up of a lubricant, such as grease or oil, intermittently supplies the fluid to a lubrication site 3 through the quantitative valve 2. Several amounts of flow per shot through the quantitative valve 2 are prepared ranging from 0.005 to 1 cc, for example. One or more among these amounts are selected and installed in conformity with lubrication sites. The device K for detecting fluid flow according to the embodiment installed in a lubrication pipeline 4 from the quantitative valve 2 to the lubrication site 3, and can detect the fluid flow and determine whether the fluid is supplied or not by a detector 5.

As shown in FIGS. 2 to 5, the device K for detecting fluid flow according to the embodiment includes a body 10 that has a fluid space E having a cylindrical inner surface 11 allowing a fluid to pass therethrough, and is made up of a conductor, such as metal. In the body 10, a fluid supply port 13 having a supply aperture 12 centered on the central axis P of the fluid space E is formed at one end of this fluid space E. One end Ea of the fluid space E is formed in a manner inclined toward the supply aperture 12. A male thread 14 for connection to the lubrication pipeline is formed on an external side of a site where the supply port 13 is formed. A fluid discharge port 16 that has a discharge aperture 15 communicating with the fluid space E is formed on a side of the body 10. The discharge port 16 internally includes a female thread part 17 for connection to the lubrication pipeline 4, and is formed to have an adaptor shape allowing detachable connection to the body 10 by a thread member 18.

In this embodiment, the body 10 is configured to be one electrode Da that is made up of a conductor and includes a contact T exposed toward one side of the fluid space E. Wiring is appropriately connected to the one electrode Da. The body 10 includes a bush 20 that is made up of a conductor, such as metal, and forms the supply aperture 12. The bush 20 is a pipe-shaped member and includes the supply port 13 centered on the central axis P of the fluid space E. An end closer to the supply aperture 12 constitutes an aperture edge 21 of the supply aperture 12 formed tapering in an inclined manner, and is disposed protruding into the fluid space E. A head 23 of the bush 20, where an inlet aperture 22 opposite to the supply aperture 12 is formed, is formed to have a larger diameter than the diameter of a typical part 24. The typical part 24 of the bush 20 is engaged into an engagement hole 25 coaxial with the central axis P of the fluid space E formed in the body 10. The head 23 is continuous to the engagement hole 25, is formed to have a larger diameter than the engagement hole 25 has, and is disposed in an inlet hole 26 coaxial with the central axis P of the fluid space E opening at an end of the body 10.

The body 10 is provided with another electrode Db that has an exposure part 30 exposed on the other end face of the fluid space E and is insulated from the one electrode Da and is made up of a conductor, such as metal. The other electrode Db is formed to have a rod shape having an axis that is the axis line along the central axis P of the fluid space E. One end thereof is formed as the exposure part 30 exposed on the other end face of the fluid space E. The other end thereof is formed as a connection part 31 which protrudes from the body 10 and on which a male thread is formed. The other electrode Db is made up of an insulator, such as resin, and is held by a holding member 33 detachably provided for the body 10 by a thread member 32. The holding member 33 has an axis that is the axis line along the central axis P of the fluid space E. In this member, the exposure part 30 of the other electrode Db internally resides, the other end of a coil spring 41, described later, is stored, and a holding hole 34 that holds the connection part 31 while allowing this part to protrude is formed. The other electrode Db is fixed in the holding hole 34 by press fitting or screw fixing into the holding hole 34. A nut 35 for allowing a ring-shaped terminal (not shown) of wiring 7 (FIG. 1) inserted into the connection part 31 to be fixed is screwed on the male thread of the connection part 31.

As shown in FIGS. 2 to 7, the fluid space E internally stores: a valve member 40 that is made up of a conductor, such as metal, is moved along the central axis P of the fluid space E, comes into contact with the contact T of the one electrode Da to close the supply aperture 12, and comes apart from the contact T to open the supply aperture 12; and a coil spring 41 that is made up of a conductor, such as metal, is connected to the valve member 40 at one end while being connected to the exposure part 30 of the other electrode Db at the other end, and always urges the valve member 40 in a direction of closing the supply aperture 12. Accordingly, this flow detecting device K can detect the fluid flow by electrically detecting connection when the valve member 40 is closed (FIG. 2) and disconnection when this member is opened (FIG. 3) in the electric circuit that includes the one electrode Da, the valve member 40, the coil spring 41 and the other electrode Db.

In detail, as shown in FIGS. 4(*a*), 4(*b*) and 4(*c*), the contact T of the one electrode Da is provided at the aperture edge 12*a* of the supply aperture 12 and/or the peripheral part 12*b* of the aperture edge 12*a*. The peripheral part 12*b* includes the aperture edge 21 of the bush 20 at the supply aperture 12, and an outer peripheral part 28 that is a part of the one end Ea of the fluid space E outer than the bush 20. The aperture edge 21 of the bush 20 at the supply aperture 12 is formed tapering in an inclined manner, and is formed to protrude into the fluid space E.

Figure 5:
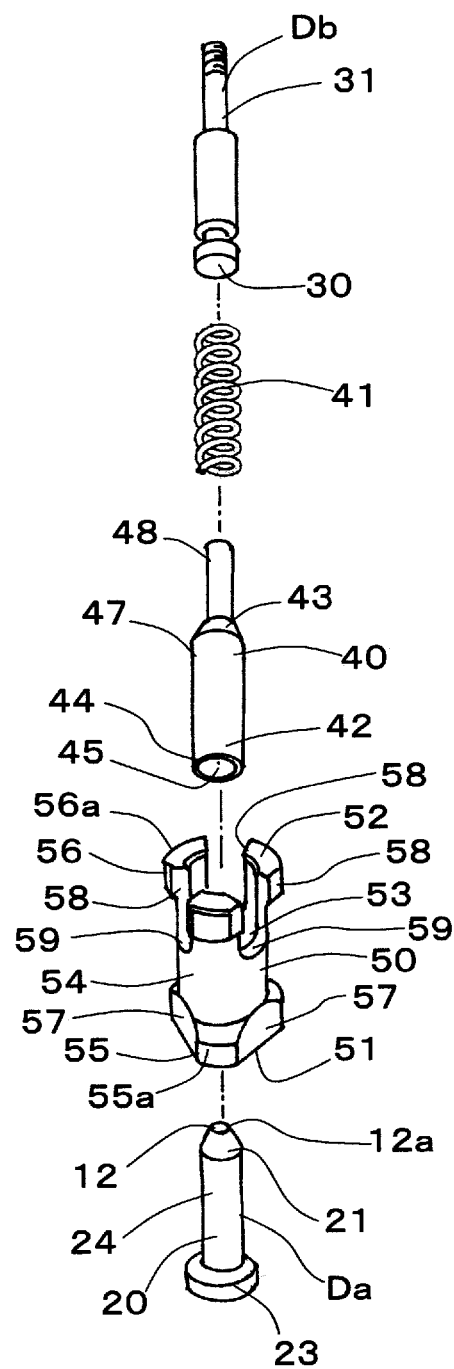
FIG. 5 is an exploded perspective view showing components in a body in the device for detecting fluid flow according to the embodiment of the invention.
Figure 6:
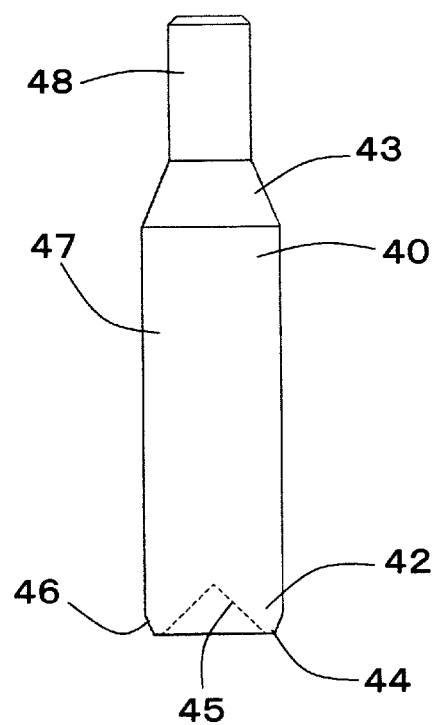
FIG. 6 is a front view showing the valve member in the device for detecting fluid flow according to the embodiment of the invention.
Figure 7A:
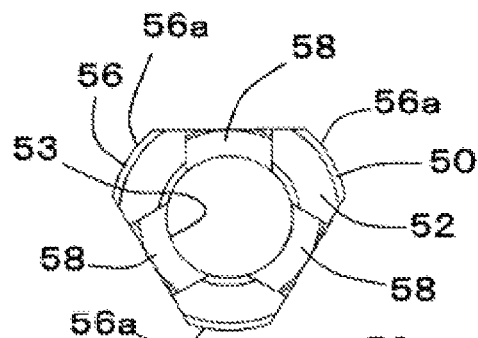
FIGS. 7(a), 7(b), 7(c) and 7(d) show a guide member in the device for detecting fluid flow according to the embodiment of the invention.
Figure 7B:
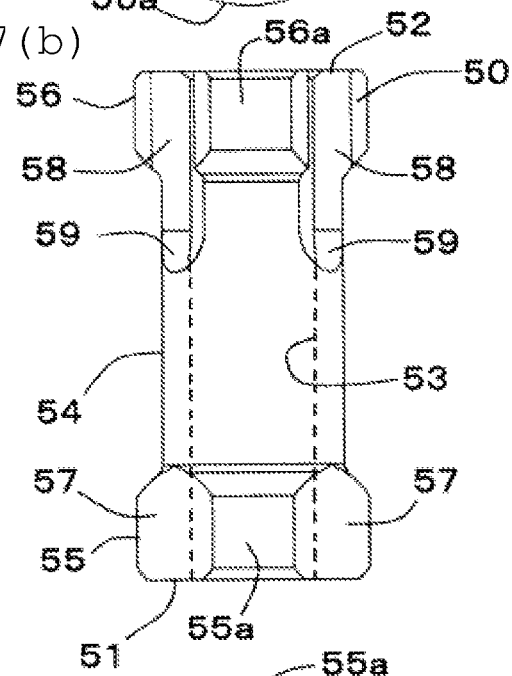
Figure 7D:
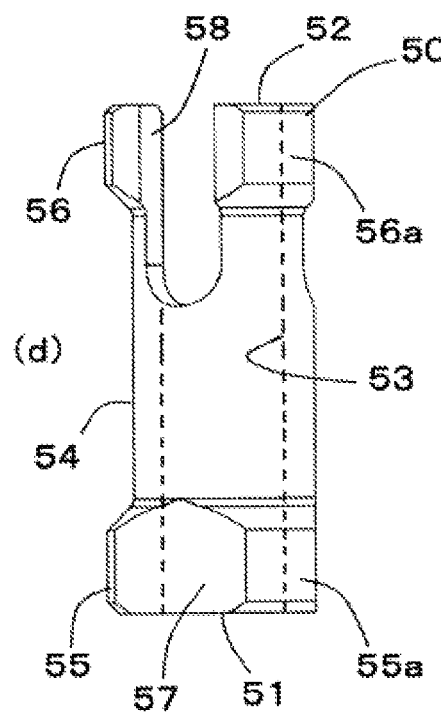
Figure 7C:
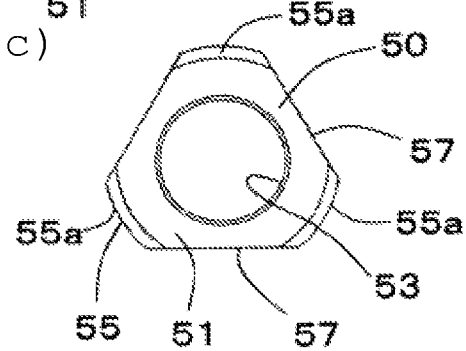

The valve member 40 is formed to have a rod shape that includes a distal end 42 capable of coming into contact with the contact T to block the supply aperture 12, and has an axis on the axis line along the central axis P of the fluid space E. As shown in FIG. 5, the valve member 40 includes: a large-diameter part 47 that is nearer to the distal end and to be fitted into an insertion hole 53 of the guide member 50, described later; and a small-diameter part 48 that is nearer to the rear end and is formed narrower than the large-diameter part 47 so as to be inserted into the coil spring 41. One end of the coil spring 41 is held by a step part 43 between the large-diameter part 47 and the small-diameter part 48. The distal end 42 of the valve member 40 is configured to include a depression part 45 that faces the aperture edge 21 at the supply aperture 12 and is depressed inward. The depression part 45 is formed to have a conical shape having an axis on the axis line along the central axis P of the fluid space E. Meanwhile, the aperture edge 21 of the bush 20 at the supply aperture 12 is formed to protrude into the fluid space E so as to face the inside of the depression part 45 when the valve member 40 blocks the supply aperture 12.

The contact of the valve member 40 with the contact T of the one electrode Da is achieved onto the peripheral part 12*b* of the supply aperture 12. As shown in FIG. 4(*a*), the inner surface of the depression part 45 of the distal end 42 is in contact with the external surface of the aperture edge 21 of the bush 20, and a peripheral part 44 of the depression part 45 is in contact with the outer peripheral part 28 that is of the one end Ea of the fluid space E and is outer than the aperture edge 21 of the bush 20.

However, the contact of the valve member 40 with the contact T of the one electrode Da is not limited to the mode shown in FIG. 4(*a*). For example, the shape and dimensions of each member may be defined so as to achieve a mode where the peripheral edge part 44 of depression part 45 is in contact only with the outer peripheral part 28 that is of the one end Ea of the fluid space E and is outer than the aperture edge 21 of the bush 20 as shown in FIG. 4(*b*) or to achieve a mode where only the inner surface of the depression part 45 of the distal end 42 is in contact with the external surface of the aperture edge 21 of the bush 20 as shown in FIG. 4(*c*).

As show in FIGS. 2 to 6 and 8, this flow detecting device K includes the guide member 50 that is made up of an insulator, such as resin, and is additionally provided for the valve member 40 and is provided in the fluid space E. The guide member 50 is configured to secure the flow path of the fluid from the supply aperture 12 to the discharge aperture 15 while being slidable on the cylindrical inner surface 11 of the fluid space E, has a reception surface 51 facing one end face of the fluid space E while receiving the fluid from the supply aperture 12, and has a top surface 52 facing another end face of the fluid space E.

In detail, the insertion hole 53 is formed to penetrate the guide member 50. This hole has an axis on the axis line along the central axis P of the fluid space E. In this hole, the distal end 42 of the valve member 40 is inserted, with the distal end 42 protruding therefrom, and the one end of the coil spring 41 is stored at the other end face of the fluid space E. A narrow part 54 allowing the fluid to pass along the circumferential direction is formed on the outer periphery of the intermediate part of the guide member 50. A part of the guide member 50 nearer to the one end face of the fluid space E is configured as a one-end slider 55 that includes a reception surface 51 and includes a one-end slide surface 55*a* slidable on the cylindrical inner surface 11 of the fluid space E. A part of the guide member 50 nearer to the other end face of the fluid space E is configured as another-end slider 56 that includes a top surface 52 and includes another-end slide surface 56*a* slidable on the cylindrical inner surface 11 of the fluid space E. The valve member 40 is inserted into the insertion hole 53 of the guide member 50, thereby integrating these members. Consequently, production is facilitated.

One-end notches 57 that range between the reception surface 51 and the narrow part 54 and allow the fluid to pass therethrough are formed on the outer side of the one-end slider 55. The multiple (three in this embodiment) one-end notches 57 are provided. The one-end notches 57 are each formed to have an identical size and an identical shape, and are arranged about the axis line at regular angular intervals.

Meanwhile, another-end notches 58 that range between the top surface 52 and the narrow part 54 and allow the fluid to pass therethrough are formed on the outer side of the other-end slider 56. The multiple (three in this embodiment) other-end notches 58 are provided. The other-end notches 58 are each formed to have an identical size and an identical shape, and are arranged about the axis line at regular angular intervals.

Multiple communication paths 59 communicating with the insertion hole 53 are formed at sites of the guide member 50 that correspond to the small-diameter part 48 of the valve member 40 and are at least any of the narrow part 54, the one-end notches 57, and the other end notches 58. In the embodiment, the small-diameter part 48 is provided for the valve member 40 nearer to the rear end. One end of the coil spring 41 is stored in the insertion hole 53. The multiple (three) communication paths 59 are formed at sites where the narrow part 54 and/or the other-end notches 58 of the guide member 50 reside (sites ranging from the other-end notches 58 to a part of the narrow part 54, in the embodiment).

Consequently, as shown in FIG. 1, in a case where the flow detecting device K according to the embodiment is used, for example, the supply port 13 and the discharge port 16 are connected to the lubrication pipeline 4 from the quantitative valve 2 to the lubrication site to intervene therebetween, the wiring 6 from the detector 5 is connected to the one electrode Da (body 10), and the wiring 7 is connected to the other electrode Db respectively, a voltage is always applied to the electric circuit that includes the one electrode Da, the valve member 40, the coil spring 41 and the other electrode Db, and connection of the electric circuit when the valve member 40 is closed (FIG. 2) and disconnection when this member is opened (FIG. 3) are electrically sensed by the detector 5.

Figure 2:
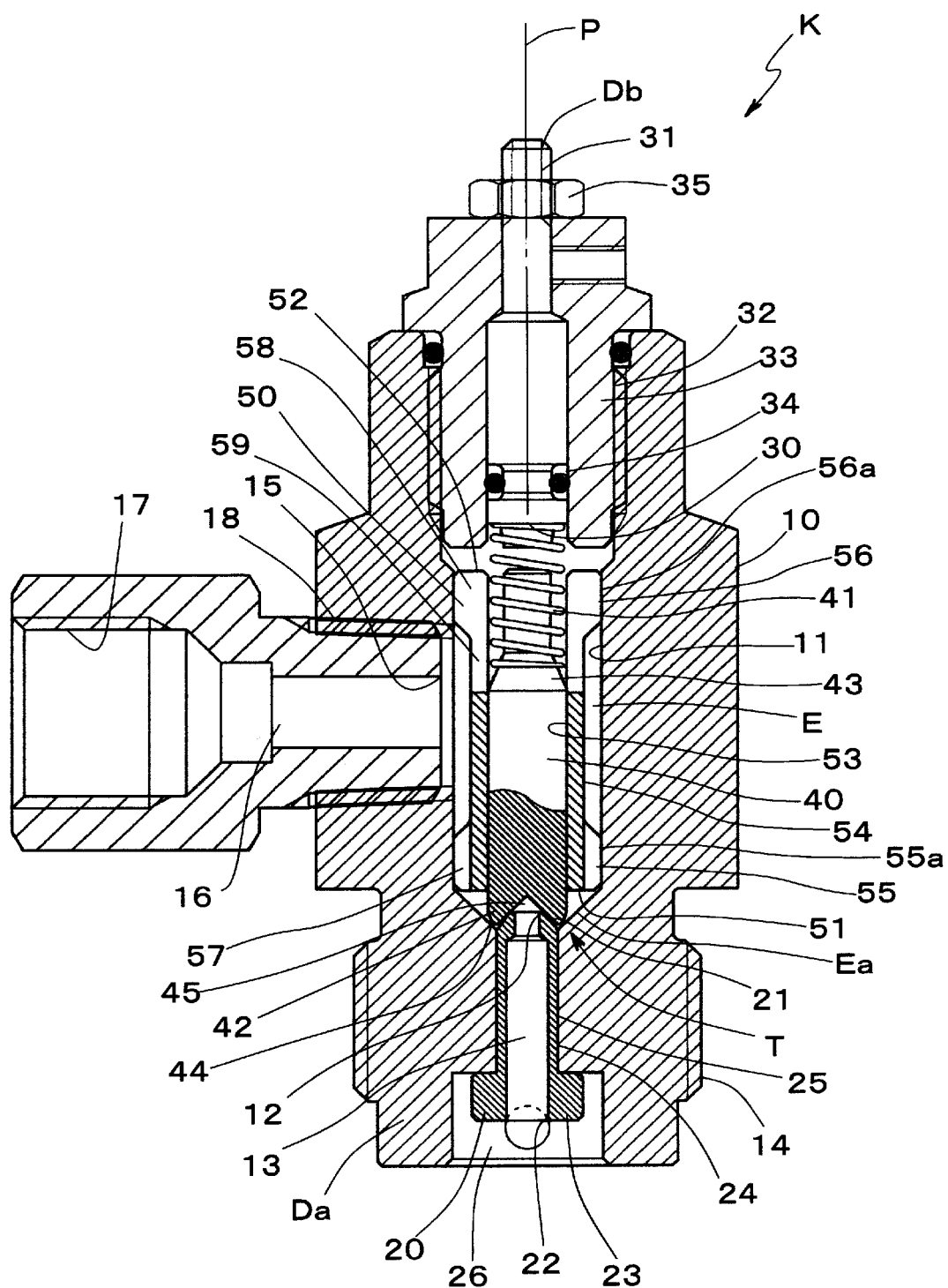
FIG. 2 is a sectional view showing the device for detecting fluid flow according to the embodiment of the invention.
Figure 3:
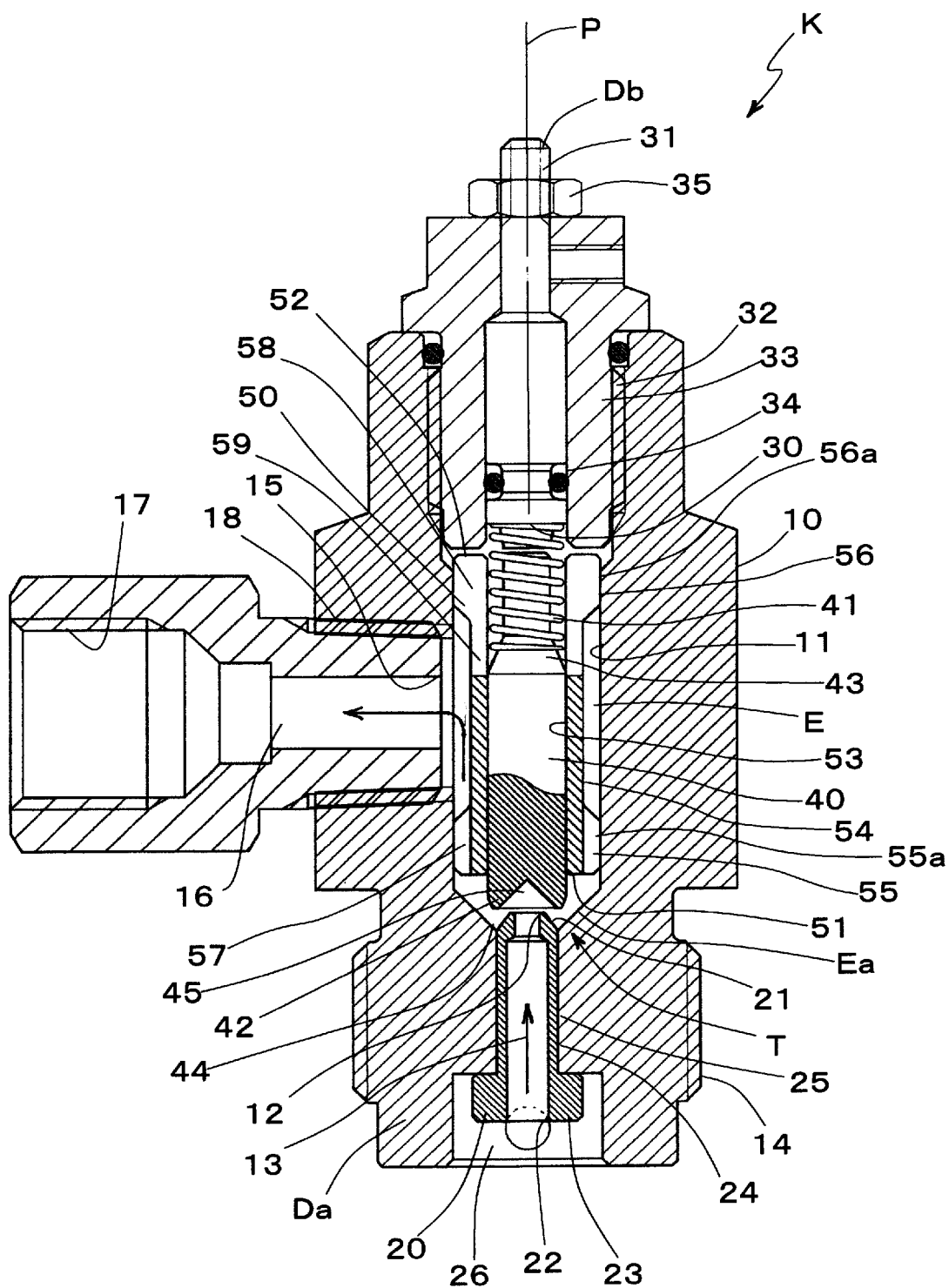
FIG. 3 is a sectional view showing an operation state in the device for detecting fluid flow according to the embodiment of the invention.

In detail, at the closed position of the valve member 40 shown in FIG. 2, when the fluid is supplied through the supply port 13, as shown in FIG. 3, the fluid flows into the fluid space through the supply aperture 12 into the fluid space E, the fluid is applied onto the valve member 40 and the reception surface 51 of the guide member 50 accompanying the valve member 40, and the guide member 50 slides on the cylindrical inner surface 11 of the fluid space E. Accordingly, the valve member 40 and the guide member 50 are integrally pushed above, thereby opening the valve member 40. When the supply of the fluid through the fluid supply port 13 is stopped, the valve member 40 and the guide member 50 are moved toward the one end face of the fluid space E by the urging force of the coil spring 41, and the valve member 40 closes the supply aperture 12, as shown in FIG. 2.

In this case, when the fluid is supplied through the supply port 13, as shown in FIG. 3, the fluid is received also by the reception surface 51 of the guide member 50. Accordingly, the valve member 40 easily floats. Consequently, the valve member 40 can be securely apart from the supply aperture 12. For example, when the flow rate of the fluid is relatively low, specifically, for example, when the flow rate is significantly low, i.e., 0.1 cc or less, or even when the flow rate of the fluid is relatively high but the flow velocity is low under situations or the like of a large number of quantitative valves in use, the amount of movement (lifting amount) of the valve member is significantly small. However, the valve member 40 is securely pushed upward by floating of the guide member 50. Accordingly, the valve member 40 can securely come apart from the contact T of the one electrode Da where the supply aperture 12 resides. Consequently, even though the fluid flows as in the conventional art, a situation can be prevented where the valve member 40 does not entirely come apart from the one electrode Da and a part thereof is maintained to be in contact and opening (disconnection) cannot be detected. The detection reliability can be improved. Even when the top surface 52 of the guide member 50 is in contact with the other end face of the fluid space E, short circuit is prevented, because the guide member 50 is made up of an insulator.

The conical depression part 45 depressed inward is formed at the distal end 42 of the valve member 40. Accordingly, when the fluid is supplied through the supply port 13, the fluid flowing through the supply aperture 12 rebounds by the depression part 45 and becomes difficult to escape outward, and the fluid can be easily received. Consequently, the valve member 40 can further easily float upward. Therefore, the valve member 40 can securely come apart from the contact T of the one electrode Da where the supply aperture 12 resides. Furthermore, the aperture edge 21 of the supply aperture 12 is formed in the protruding manner. Accordingly, the fluid can flow intensively into the depression part 45 of the valve member 40. Consequently, the configuration capable of further easily receiving the fluid can be achieved, which can facilitate floating of the valve member 40. Accordingly, the valve member 40 can securely come apart from the contact T of the one electrode Da where the supply aperture 12 resides. The diameter of the supply aperture 12 is smaller than the diameter of the aperture of the depression part 45. Accordingly, the flow velocity of the fluid can be higher than that in a case where the diameter of the supply aperture 12 is substantially identical to the diameter of the aperture of the depression part 45. Also in this point, the valve member 40 can easily float, and the valve member 40 can securely come apart from the one electrode Da where the supply aperture 12 resides. Consequently, the detection reliability can be further improved. When the valve member 40 is returned, the aperture edge of the depression part 45 has an acute angle. Consequently, the effect of sharing the fluid occurs, and the closing operation can be smoothly performed accordingly.

Furthermore, the guide member 50 slides on the cylindrical inner surface 11 of the fluid space E while securing the fluid flow path from the supply aperture 12 to the discharge aperture 15, thereby allowing the fluid to be introduced from the discharge aperture 15 to the discharge port 16. That is, when the valve member 40 and the guide member 50 are pushed upward by the fluid, the fluid passes through the one-end notches 57 and the narrow part 54 and reaches the discharge aperture 15, and is discharged through the discharge port 16. In this case, the narrow part 54 is provided. Accordingly, the resistance against the fluid is reduced. Consequently, the fluid can be securely guided through the supply aperture 12 to the discharge aperture 15. The guide member 50 includes the one-end slider 55 and the other-end slider 56 at the opposite ends, with the narrow part 54 intervening therebetween. Accordingly, this member is prevented from being inclined due to the fluid flow. Furthermore, the fluid can pass through the other-end notches 58. Consequently, the guide member 50 can smoothly slide and move when the valve member 40 is opened and closed. Accordingly, when the valve member 40 is opened, the valve member 40 can easily float. When the valve member 40 is closed, the fluid flow path from the supply aperture 12 to the discharge aperture 15 is secured in the guide member 50. Consequently, the supply aperture 12 can be securely closed without obstructing the returning operation of the valve member 40. The one end of the coil spring 41 is stored in the insertion hole 53. Consequently, the holding becomes stable. Also in this point, the valve member 40 and the guide member 50 can be smoothly moved.

The one-end notches 57 are each formed to have the same size and shape, and are arranged at regular angular intervals. Likewise, the other-end notches 58 are each formed to have the same size and shape, and are arranged at regular angular intervals. Accordingly, the fluid flow becomes uniform. Consequently, when the valve member 40 is opened, the fluid can be securely introduced, while smoothly moving the valve member 40 and the guide member 50. When the valve member 40 is closed, the supply aperture 12 can be securely closed.

Furthermore, the multiple (three) communication paths 59 are formed at the sites ranging from the other-end notches 58 to the part of the narrow part 54 of the guide member 50. The resistance against the fluid is reduced accordingly. Consequently, the fluid can easily flow. Accordingly, when the valve member 40 is opened, the fluid can be securely introduced, while smoothly moving the valve member 40 and the guide member 50. When the valve member 40 is closed, the supply aperture 12 can be securely closed.

In the embodiment described above, the bush 20 is formed separately from the typical part of the body 10. The configuration is not necessarily limited thereto. The bush 20 may be formed integrally with the body 10. The configuration may be appropriately modified.

Next, although not shown, a flow detecting device K according to an embodiment different from those described above is described. Unlike the above description, according to this embodiment, the guide member 50 is made up of a conductor and is formed integrally with the valve member 40. The body 10 is made up of an insulator, except for the bush 20. Only the bush 20 serves as the one electrode Da. In this case, contact between the valve member 10 and the one electrode Da is in a mode shown in FIG. 4(a) or 4(c). The operation and advantageous effects analogous to those described above are exerted.

Figure 8:
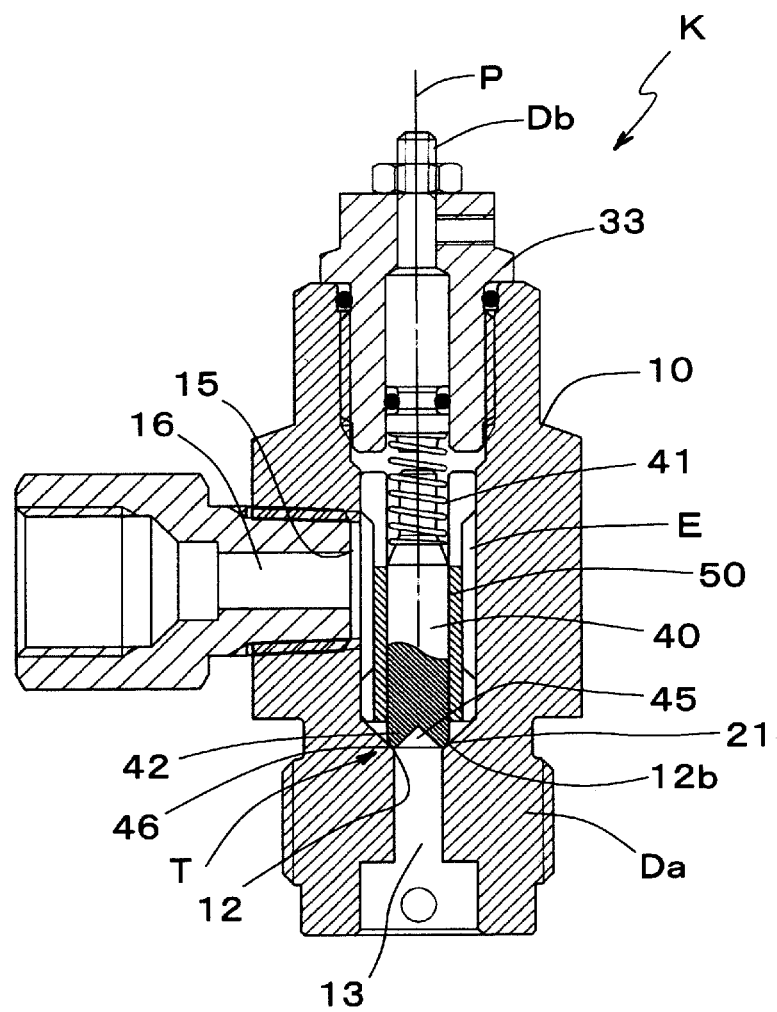
FIG. 8 is a sectional view showing a device for detecting fluid flow according to another embodiment of the invention.

FIG. 8 shows a flow detecting device K according to another embodiment of the invention. Unlike the above description, the bush 20 is not provided here. The body 10 made up of a conductor, such as metal, constitutes the one electrode Da. Accordingly, the aperture edge 21 of the supply aperture 12 is formed not to protrude into the fluid space E, but is open at the one end Ea of the fluid space E. An outer peripheral edge 46 (FIG. 6) of the peripheral part 44 of the depression part 45 constitutes the contact T of the one electrode Da, and is allowed to contact with the aperture edge 21 (peripheral part 12b) of the supply aperture 12 formed at the one end Ea of the fluid space E. This configuration also exerts the operation and advantageous effects substantially analogous to those described above.

Figure 9:
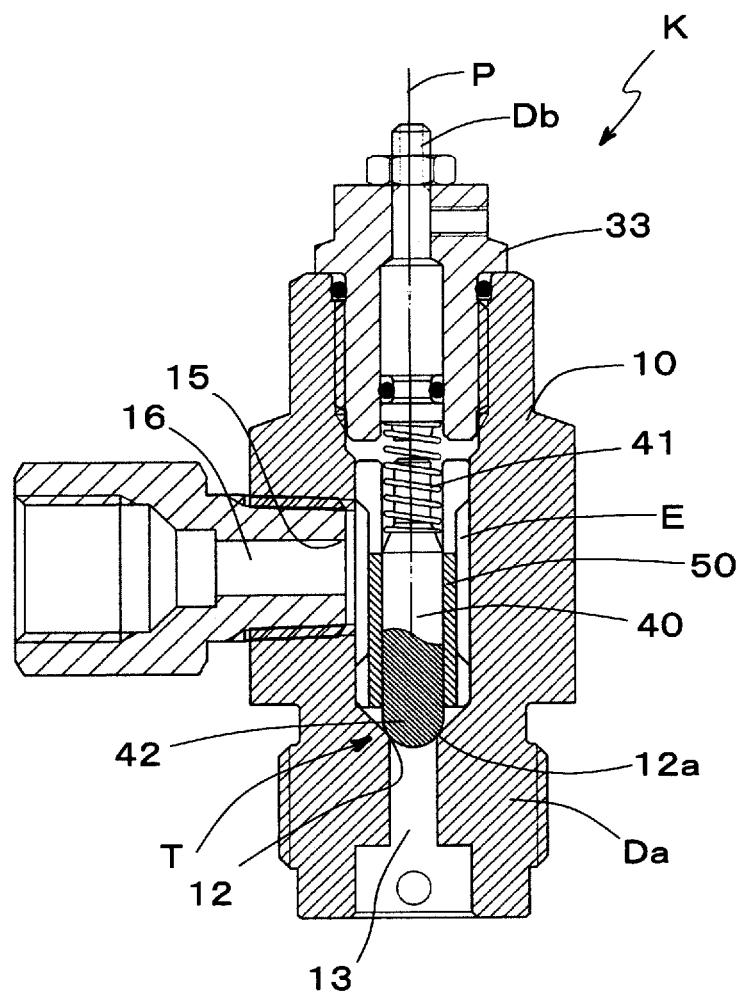
FIG. 9 is a sectional view showing a device for detecting fluid flow according to still another embodiment of the invention.

FIG. 9 shows a flow detecting device K according to still another embodiment of the invention. Unlike the flow detecting device K shown in FIG. 8, the distal end 42 of the valve member 40 is formed to bulge half-spherically. An external surface of the distal end 42 constitutes the contact T of the one electrode Da, and is allowed to contact with the aperture edge 12a of the supply aperture 12 formed at the one end Ea of the fluid space E. At the guide member 50, this configuration also exerts the operation and advantageous effects substantially analogous to those described above.

Figure 10:
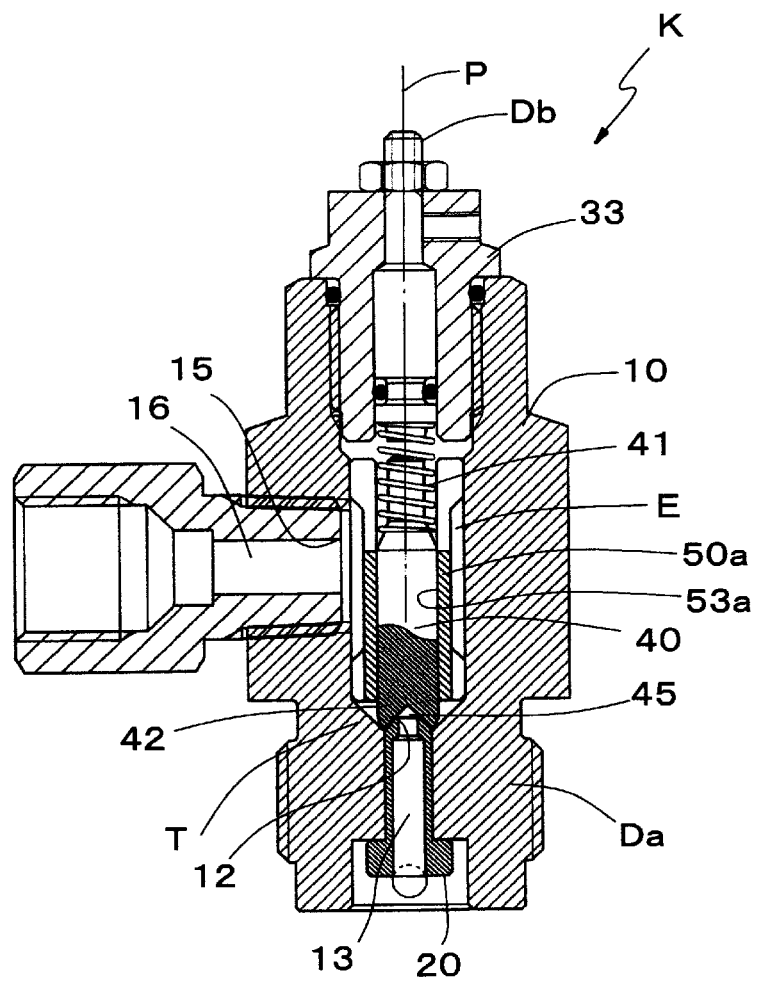
FIG. 10 is a sectional view showing a device for detecting fluid flow according to yet another embodiment of the invention.

FIG. 10 shows a flow detecting device K according to yet another embodiment of the invention. Unlike the flow detecting device K shown in FIGS. 2 and 3, the valve member 40 is provided with a guide member 50a having the same shape as that described above in a manner allowing the valve member 40 to slide. A slide hole 53a is formed to penetrate the guide member 50a. This hole has an axis on the axis line along the central axis P of the fluid space E. In this hole, the distal end 42 of the valve member 40 is slidably inserted, with the distal end 42 protruding therefrom, and the one end of the coil spring 41 is stored at the other end face of the fluid space E. That is, unlike the flow detecting device K described above including the integrated valve member 40 and guide member 50, this flow detecting device K allows the valve member 40 to slide with the guide member 50a.

Although not shown, an embodiment can also be adopted as the flow detecting device K according to the embodiment of the invention. In the configuration where the valve member 40 is slidable with the slide hole 53a of the guide member 50a as with the flow detecting device K shown in FIG. 10, the guide member 50a may be fixed to the body 10, the holding member 33 or the like to prevent movement even with the fluid flow. At the depression part 45 of the valve member 40, the operation and advantageous effects analogous to those described above can be exerted.

Figure 11:
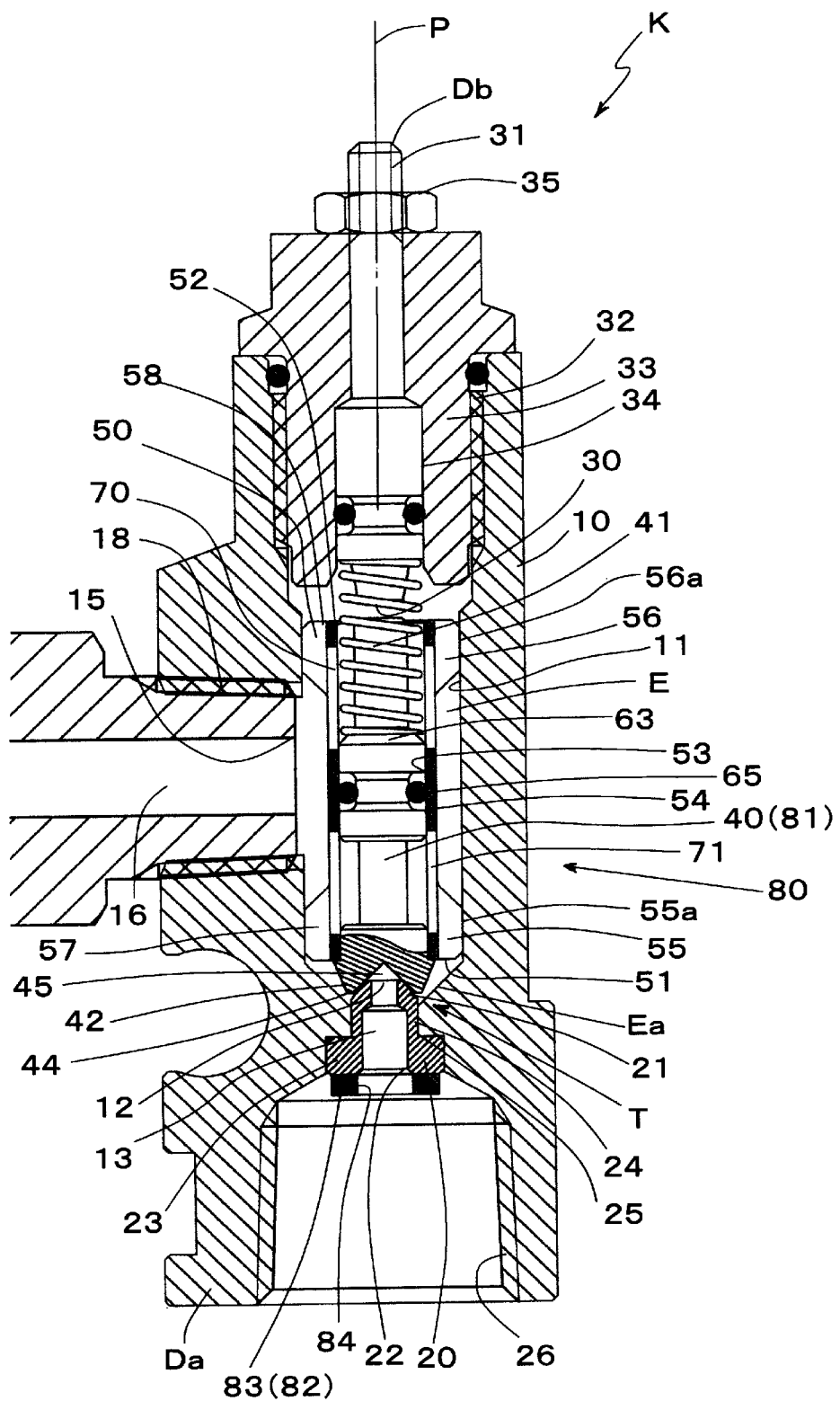
FIG. 11 is a sectional view showing the device for detecting fluid flow according to still another embodiment of the invention.
Figure 12:
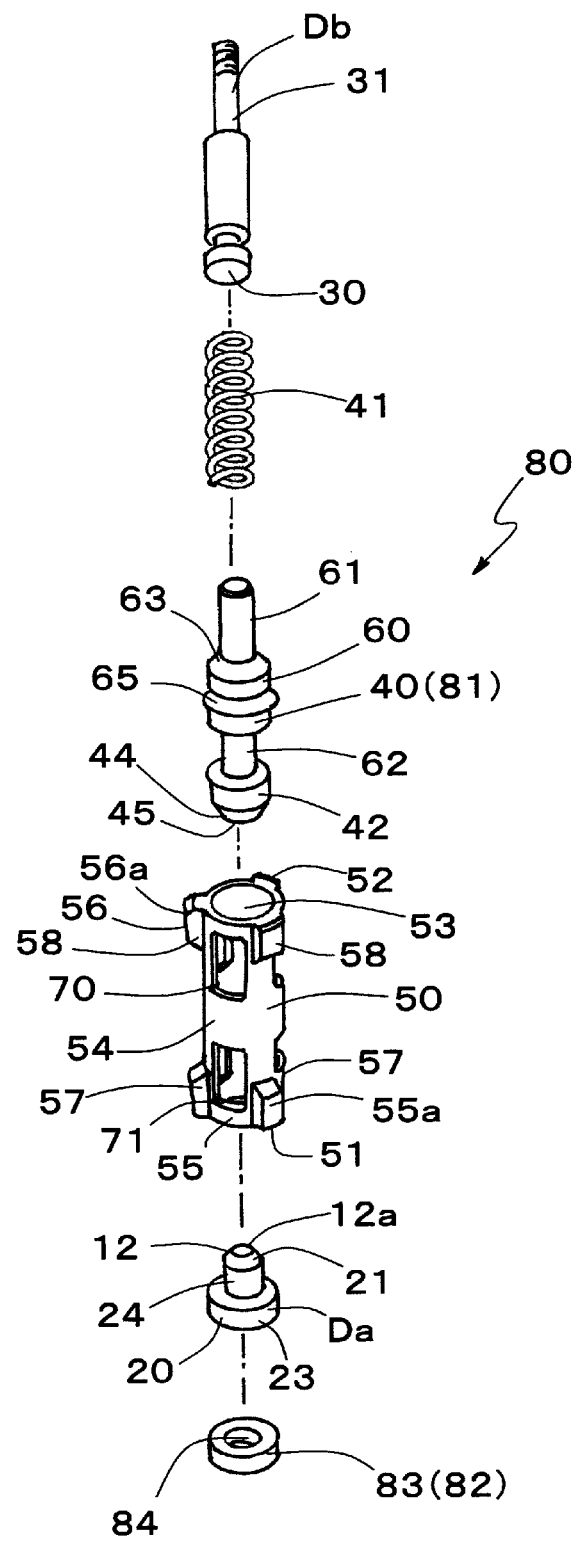
FIG. 12 is an exploded perspective view showing components in a body in the device for detecting fluid flow according to the other embodiment of the invention.

Next, FIGS. 11 and 12 show a flow detecting device K according to another embodiment of the invention. The flow detecting device K includes a body 10 that has a fluid space E having a cylindrical inner surface 11 allowing a fluid to pass therethrough, and is made up of a conductor, such as metal. In the body 10, a fluid supply port 13 having a supply aperture 12 centered on the central axis P of the fluid space E is formed at one end of this fluid space E. One end Ea of the fluid space E is formed in a manner inclined toward the supply aperture 12. A fluid discharge port 16 that has a discharge aperture 15 communicating with the fluid space E is formed on a side of the body 10. The discharge port 16 is formed to have an adaptor shape allowing detachable connection to the body 10 by the thread member 18.

In this embodiment, the body 10 is configured to be one electrode Da that is made up of a conductor and includes a contact T exposed toward one side of the fluid space E. Wiring is appropriately connected to the one electrode Da. The body 10 includes a bush 20 that is made up of a conductor, such as metal, and forms the supply aperture 12. The bush 20 is a pipe-shaped member and includes the supply port 13 centered on the central axis P of the fluid space E. An end closer to the supply aperture 12 constitutes an aperture edge 21 of the supply aperture 12 formed tapering in an inclined manner, and is disposed protruding into the fluid space E. A head 23 of the bush 20, where an inlet aperture 22 opposite to the supply aperture 12 is formed, is formed to have a larger diameter than the diameter of a typical part 24. The typical part 24 of the bush 20 is engaged into an engagement hole 25 coaxial with the central axis P of the fluid space E formed in the body 10. The head 23 is continuous to the engagement hole 25, is formed to have a larger diameter than the engagement hole 25 has, and is disposed in an inlet hole 26 coaxial with the central axis P of the fluid space E opening at an end of the body 10.

The body 10 is provided with another electrode Db that has an exposure part 30 exposed on the other end face of the fluid space E and is insulated from the one electrode Da and is made up of a conductor, such as metal. The other electrode Db is formed to have a rod shape having an axis that is the axis line along the central axis P of the fluid space E. One end thereof is formed as the exposure part 30 exposed on the other end face of the fluid space E. The other end thereof is formed as a connection part 31 which protrudes from the body 10 and on which a male thread is formed. The other electrode Db is made up of an insulator, such as resin, and is held by a holding member 33 detachably provided for the body 10 by a thread member 32. The holding member 33 has an axis that is the axis line along the central axis P of the fluid space E. In this member, the exposure part 30 of the other electrode Db internally resides, the other end of a coil spring 41, described later, is stored, and a holding hole 34 that holds the connection part 31 while allowing this part to protrude is formed. The other electrode Db is fixed in the holding hole 34 by press fitting or screw fixing into the holding hole 34. A nut 35 for allowing a ring-shaped terminal (not shown) of wiring 7 (FIG. 1) inserted into the connection part 31 to be fixed is screwed on the male thread of the connection part 31.

The fluid space E internally stores: a valve member 40 that is made up of a conductor, such as metal, is moved along the central axis P of the fluid space E, comes into contact with the contact T of the one electrode Da to close the supply aperture 12, and comes apart from the contact T to open the supply aperture 12; and a coil spring 41 that is made up of a conductor, such as metal, is connected to the valve member 40 at one end while being connected to the exposure part 30 of the other electrode Db at the other end, and always urges the valve member 40 in a direction of closing the supply aperture 12. Accordingly, this flow detecting device K can detect the fluid flow by electrically detecting connection when the valve member 40 is closed (FIG. 2) and disconnection when this member is opened (not shown) in the electric circuit that includes the one electrode Da, the valve member 40, the coil spring 41 and the other electrode Db.

In detail, as described above, as shown in FIGS. 4(*a*), 4(*b*) and 4(*c*), the contact T of the one electrode Da is provided at the aperture edge 12*a* of the supply aperture 12 and/or the peripheral part 12*b* of the aperture edge 12*a*. The peripheral part 12*b* includes the aperture edge 21 of the bush 20 at the supply aperture 12, and an outer peripheral part 28 that is a part of the one end Ea of the fluid space E outer than the bush 20. The aperture edge 21 of the bush 20 at the supply aperture 12 is formed tapering in an inclined manner, and is formed to protrude into the fluid space E.

The valve member 40 is formed to have a rod shape that includes a distal end 42 capable of coming into contact with the contact T to block the supply aperture 12, and has an axis on the axis line along the central axis P of the fluid space E. As shown in FIG. 12, the valve member 40 includes: a large-diameter part 60 that is provided at the middle and to be fitted into an insertion hole 53 of the guide member 50, described later; a small-diameter part 61 that is formed narrower than the large-diameter part 60 so as to be insertable into the coil spring 41 and is nearer to the rear end; and a small-diameter part 62 that is provided between the distal end 42 and the large-diameter part 60 of the valve member 40. One end of the coil spring 41 is held by a step part 63 between the large-diameter part 60 and the small-diameter part 61. An O-ring 64 is arranged around the large-diameter part 60, the O-ring being elastically in contact with the inner surface of the insertion hole 53, described later, and the large-diameter part 60 is fitted into the insertion hole 53 via the O-ring 64.

The distal end 42 of the valve member 40 is configured to include a depression part 45 that faces the aperture edge 21 at the supply aperture 12 and is depressed inward. The depression part 45 is formed to have a conical shape having an axis on the axis line along the central axis P of the fluid space E. Meanwhile, the aperture edge 21 of the bush 20 at the supply aperture 12 is formed to protrude into the fluid space E so as to face the inside of the depression part 45 when the valve member 40 blocks the supply aperture 12.

The contact of the valve member 40 with the contact T of the one electrode Da is achieved onto the peripheral part 12*b* of the supply aperture 12. As shown in FIG. 4(*a*), the inner surface of the depression part 45 of the distal end 42 is in contact with the external surface of the aperture edge 21 of the bush 20, and a peripheral part 44 of the depression part 45 is in contact with the outer peripheral part 28 that is of the one end Ea of the fluid space E and is outer than the aperture edge 21 of the bush 20. However, the contact of the valve member 40 with the contact T of the one electrode Da is not limited to the mode shown in FIG. 4(*a*). For example, the shape and dimensions of each member may be defined so as to achieve a mode where the peripheral edge part 44 of depression part 45 is in contact only with the outer peripheral part 28 that is of the one end Ea of the fluid space E and is outer than the aperture edge 21 of the bush 20 as shown in FIG. 4(*b*) or to achieve a mode where only the inner surface of the depression part 45 of the distal end 42 is in contact with the external surface of the aperture edge 21 of the bush 20 as shown in FIG. 4(*c*).

This flow detecting device K includes the guide member 50 that is made up of an insulator, such as resin, and is additionally provided for the valve member 40 and is provided in the fluid space E. The guide member 50 is configured to secure the flow path of the fluid from the supply aperture 12 to the discharge aperture 15 while being slidable on the cylindrical inner surface 11 of the fluid space E, has a reception surface 51 facing one end face of the fluid space E while receiving the fluid from the supply aperture 12, and has a top surface 52 facing another end face of the fluid space E.

In detail, the insertion hole 53 is formed to penetrate the guide member 50. This hole has an axis on the axis line along the central axis P of the fluid space E. In this hole, the distal end 42 of the valve member 40 is inserted, with the distal end 42 protruding therefrom, and the one end of the coil spring 41 is stored at the other end face of the fluid space E. The large-diameter part 60 of the valve member 40 is fitted into the insertion hole 53 via the O-ring 64. The fitting is achieved by the O-ring. Consequently, the valve member can be easily fitted to the guide member.

A narrow part 54 allowing the fluid to pass along the circumferential direction is formed on the outer periphery of the intermediate part of the guide member 50. A part of the guide member 50 nearer to the one end face of the fluid space E is configured as a one-end slider 55 that includes a reception surface 51 and includes a one-end slide surface 55*a* slidable on the cylindrical inner surface 11 of the fluid space E. A part of the guide member 50 nearer to the other end face of the fluid space E is configured as another-end slider 56 that includes a top surface 52 and includes another-end slide surface 56*a* slidable on the cylindrical inner surface 11 of the fluid space E. The valve member 40 is inserted into the insertion hole 53 of the guide member 50, thereby integrating these members. Consequently, production is facilitated.

One-end notches 57 that range between the reception surface 51 and the narrow part 54 and allow the fluid to pass therethrough are formed on the outer side of the one-end slider 55. The multiple (three in this embodiment) one-end notches 57 are provided. The one-end notches 57 are each formed to have an identical size and an identical shape, and are arranged about the axis line at regular angular intervals.

Meanwhile, another-end notches 58 that range between the top surface 52 and the narrow part 54 and allow the fluid to pass therethrough are formed on the outer side of the other-end slider 56. The multiple (three in this embodiment) other-end notches 58 are provided. The other-end notches 58 are each formed to have an identical size and an identical shape, and are arranged about the axis line at regular angular intervals.

Multiple communication paths 70 communicating with the insertion hole 53 are formed at sites of the guide member 50 that correspond to the small-diameter part 61 of the valve member 40 and are at least any of the narrow part 54, the one-end notches 57, and the other end notches 58. In the embodiment, the small-diameter part 48 is provided for the valve member 40 nearer to the rear end. One end of the coil spring 41 is stored in the insertion hole 53. The multiple (three) communication paths 70 are formed at sites where the narrow part 54 and/or the other-end notches 58 of the guide member 50 reside (sites ranging between the other-end notches 58 and the narrow part 54, in the embodiment).

Furthermore, multiple communication paths 71 communicating with the insertion hole 53 are formed at sites of the guide member 50 that correspond to the small-diameter part 62 of the valve member 40 and are at least any of the narrow part 54, the one-end notches 57, and the other end notches 58. In the embodiment, multiple (three) communication paths 71 are formed at sites where the narrow part 54 of the guide member 50 and/or one-end notches 57 reside (sites ranging between the one-end notches 57 and the narrow part 54 in the embodiment).

Furthermore, this flow detecting device K is provided with an attracting member 80 that permits an operation of opening the valve member 40 on a contact T of one electrode Da due to the fluid supplied through the supply aperture 12, and attracts the valve member 40 toward the contact T of the one electrode Da owing to a magnetic force. The attracting member 80 includes: a first member 81 that is provided at the valve member 40, and is made up of a magnet or a magnetically attachable material magnetically attachable to a magnet; and a second member 82 that is provided at the one electrode Da and is made up of a magnet or a magnetically attachable material magnetically attachable to a magnet to attract the first member 81. In the embodiment, the first member 81 is made up of the valve member 40, and the second member 82 is provided for the body 10. Specifically, the valve member 40 (first member 81) is made of a magnetically attachable material including gold-plated iron. The second member 82 is made up of a permanent magnet 83, and is provided at a head 23 of the bush 20. The permanent magnet 83 (second member 82) is formed to have a ring shape that has a communication hole 84 that communicates with the inlet aperture 22 of the bush 20. In consideration of the balance with the conductive coil spring 41, the attracting force by the attracting member 80 is adjusted by the material and size of the permanent magnet, the magnetic permeability of the valve member 40, the distance between the valve member 40 and the permanent magnet.

Consequently, in a case where the flow detecting device K according to the other embodiment is used, this device basically performs operations analogous to those of the flow detecting device K shown in FIGS. 1 to 5 described above. That is, when the fluid is supplied through the supply port 13 with the closed position of the valve member 40, the fluid flows into the fluid space E through the supply aperture 12, the fluid is applied onto the valve member 40 and the reception surface 51 of the guide member 50 accompanying the valve member 40, and the guide member 50 slides on the cylindrical inner surface 11 of the fluid space E. Accordingly, the valve member 40 and the guide member 50 are integrally pushed above, thereby opening the valve member 40. When the supply of the fluid through the supply port 13 is stopped, the valve member 40 and the guide member 50 are moved toward the one end face of the fluid space E by the urging force of the coil spring 41, and the valve member 40 closes the supply aperture 12.

In this case, when the fluid is supplied through the supply port 13, the fluid is received also by the reception surface 51 of the guide member 50. Accordingly, the valve member 40 easily floats. Consequently, the valve member 40 can be securely apart from the supply aperture 12. Operations and advantageous effects analogous to those descried above are thus exerted. In particular, in the guide member 50, the communication paths 71 are formed nearer to the distal end of the valve member 40 in addition to the communication paths 70 nearer to the rear end of the valve member 40. The resistance against the fluid decreases accordingly, which facilitates the fluid flow. Consequently, when the valve member 40 is opened, the valve member 40 and the guide member 50 can be further smoothly moved, while the fluid is further securely introduced. When the valve member 40 is closed, the supply aperture 12 can be further securely closed.

The attracting member 80 is provided. Accordingly, as the attraction of the magnetic force by the attracting member 80 is inversely proportional to the square of the distance, the attracting force is weak during movement of the valve member 40 from the closed position to the open position. Accordingly, the valve member 40 can easily float upward. Consequently, the valve member 40 can securely come apart from the supply aperture 12. Since the configuration only with the coil spring 41 has a proportional relationship between the amount of deflection and the load, the returning characteristics of the valve member 40 from the open position to the closed position, and the pressing force to the contact T of the one electrode Da are limited. However, the attraction of the magnetic force by the attracting member 80 is inversely proportional to the square of the distance. Consequently, the returning characteristics of the valve member 40 from the open position to the closed position can be improved, and the pressing force to the contact T of the one electrode Da can be improved, thereby allowing the contact to be securely held. That is, only with the coil spring 41, the contact T is difficult to be securely closed because the contact T returns in a weakly covering manner; this is also due to the inner pressure. However, during attraction by the magnetic force, the attracting force is increased in inversely proportional to the square of the distance. Accordingly, an acceleration occurs, an insulation film (oil film) on the upper surface of the contact is broken, and an effect of cleaning the contact T also occurs. Consequently, the contact T can be securely closed.

Figures 13A, 13B:
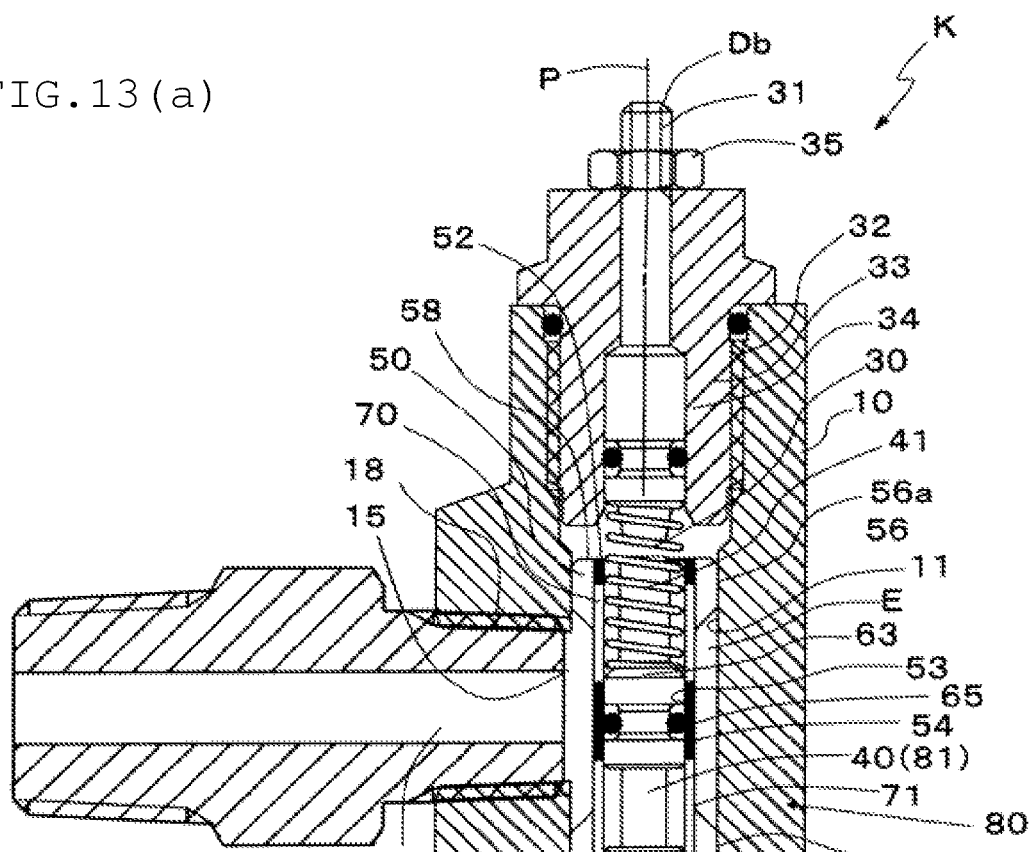
FIGS. 13(a) and 13(b) are a modified example of the device for detecting fluid flow according to the other embodiment of the invention.

FIGS. 13(*a*) and 13(*b*) show modified examples of the flow detecting device K according to the other embodiment of the invention. This device has a configuration substantially analogous to that described above. Unlike the above description, the body 10 is made of an insulating resin, and the second member 82 includes multiple (two in the embodiment) permanent magnets having N-pole surfaces and S-pole surfaces, i.e., an internal permanent magnet 83*a* and an external permanent magnet 83*b*. In the second member 82, the internal permanent magnet 83*a* is made of a conductor and is disposed to have a magnetic pole direction along the central axis P of the fluid space E, and the external permanent magnet 83*b* is disposed to have a magnetic pole direction along a direction orthogonal to the central axis P of the fluid space E. The internal permanent magnet 83*a* is formed to have a ring shape that has the communication hole 84 communicating with the inlet aperture 22 of the bush 20, and is provided at the head 23 of the bush 20. The external permanent magnet 83*b* is formed to have a disk shape, and is provided on a side surface of the body 10 that corresponds to the valve member 40 and is opposite to the discharge port 16. The internal permanent magnet 83*a* and the external permanent magnet 83*b* are disposed so that the N-pole surfaces are oriented inward and the S-pole surfaces are oriented outward.

The orientations of the magnetic pole surfaces are not limited thereto. In consideration of the balance with the conductive coil spring 41, the attracting force by the attracting member 80 is adjusted by the material and size of the permanent magnet, the magnetic permeability of the valve member 40, the distance between the valve member 40 and the permanent magnet. An adaptor 88 is screwed into the inlet hole 26 of the body 10. A conductive coil 89 intervenes between the adaptor 88 and the internal permanent magnet 83*a*. The adaptor 88 serves as the one electrode Da.

The plurality of permanent magnets that are internal permanent magnet 83*a* and the external permanent magnet 83*b* are thus used. Accordingly, the synergy can facilitate adjustment of the attracting force, and adjustment of the balance with the coil spring 41. The effective range of the magnetic forces and the magnetic lines of the permanent magnets can be adjusted. Accordingly, fluids having various types of properties can be supported. In this example, the internal permanent magnet 83*a* and the external permanent magnet 83*b* are arranged as described above. Accordingly, the range where the attracting force of the internal permanent magnet 83*a* reaches decreases. Consequently, the valve member 40 easily comes apart, and when the valve member 40 is returned, this member can securely achieve closing due to the attracting force of the internal permanent magnet 83*a*. Also described above, in general, the attracting force of a magnet is inversely proportional to the square of the distance. However, the arrangement of the external permanent magnet 83*b* can exert an effect where the attracting force of a magnet is inversely proportional to the cube of the distance. Accordingly, it is believed that the valve member 40 can be easily opened and closed. That is, according to the arrangement of the internal permanent magnet 83*a* and the external permanent magnet 83*b*, the magnetic lines of the internal permanent magnet 83*a* are captured by the external permanent magnet 83*b*, and the effective range (magnetic fields) where the internal permanent magnet 83*a* attracts the valve member 40 can be reduced. Consequently, even with a slight lifting amount of the valve member 40, the force of attracting the valve member 40 by the internal permanent magnet 83*a* can be reduced, and the valve member 40 can be easily, securely opened. The magnetic forces and arrangements of the internal permanent magnet 83*a* and the external permanent magnet 83*b* are adjusted, thereby allowing the lifting amount and lifting time (opening time) of the valve member 40 to be adjusted. While the valve member 40 is closed, the valve member 40 can be securely closed by the attracting force of the internal permanent magnet 83*a*.

In the embodiment shown in FIGS. 11 to 13(*b*), the bush 20 may be made up of a non-magnetically attachable body, or be made up of a permanent magnet or a magnetically attachable material. In the case of the configuration with a permanent magnet, the bush 40 also constitutes the second member 82. The embodiment shown in FIGS. 13 (*a*) and 13(*b*) have the configuration including the two magnets, which are the internal permanent magnet 83*a* and the external permanent magnet 83*b*. However, the configuration is not necessarily limited thereto. Alternatively, three or more magnets may be provided. The properties, such as the shapes, materials, and strengths, of the magnets, may be freely, appropriately determined. The attachment positions of the magnets may be freely, appropriately determined; for example, the magnets may be buried in the body 10. The determination may be appropriately changed.

Figure 14:
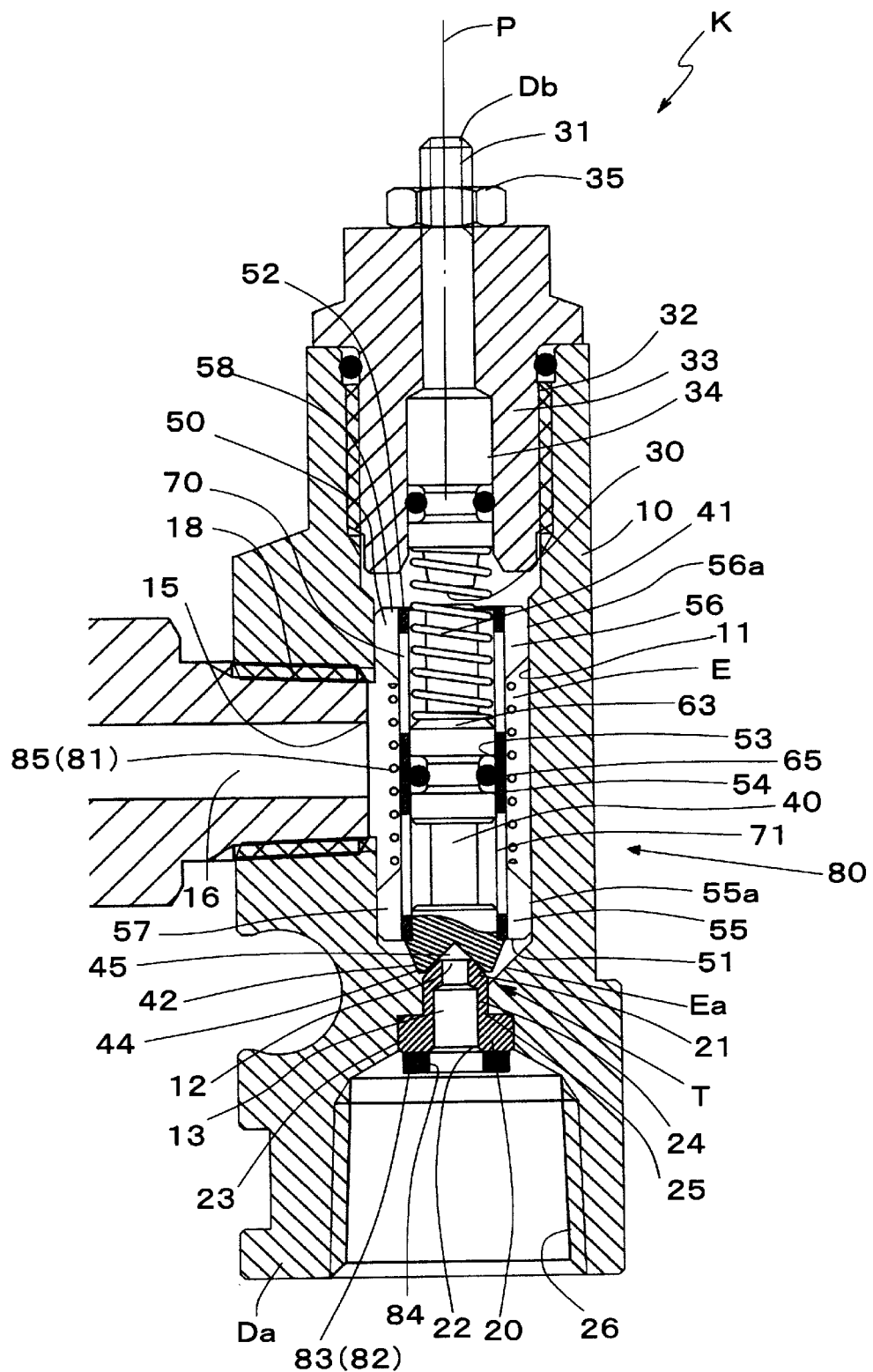
FIG. 14 is a sectional view showing a device for detecting fluid flow according to still another embodiment of the invention.

FIG. 14 shows a device K for detecting fluid flow according to still another embodiment of the invention. This device has a configuration substantially analogous to that described above. However, the configuration of the attracting member 80 is different. In the attracting member 80, the first member 81 is made up of the coil 85 that is made of a magnetically attachable material and is wound around the narrow part 54 of the guide member 50, and the second member 82 is made up of a permanent magnet 83 that is analogous to that described above and is provided additionally for the bush 20 of the body 10. The coil 85 wound around the guide member 50 is attracted, thereby allowing the valve member 40 to be indirectly attracted.

In this example, the valve member 40 may be made up of a non-magnetically attachable body, or be made up of a permanent magnet or of a magnetically attachable material. In the case of the configuration with a permanent magnet or a magnetically attachable material, the valve member 40 also constitutes the first member 81. The bush 20 may be made up of a non-magnetically attachable body, or be made up of a permanent magnet or of a magnetically attachable material. In the case of the configuration with a permanent magnet, the bush 40 also constitutes the second member 82.

Figure 15A:
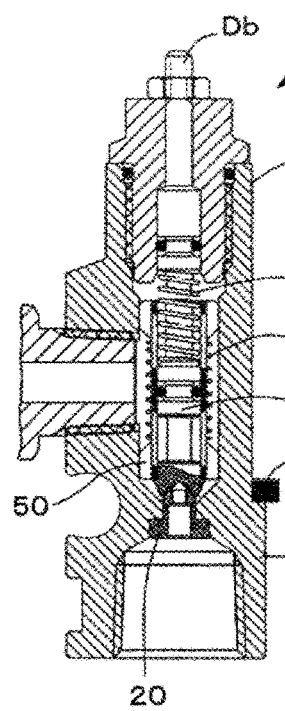
FIGS. 15(a), 15(b) and 15(c) are sectional views showing modified examples FIGS. 15(a), 15(b) and 15(c) of the device for detecting fluid flow according to the other embodiment of the invention.
Figure 15B:
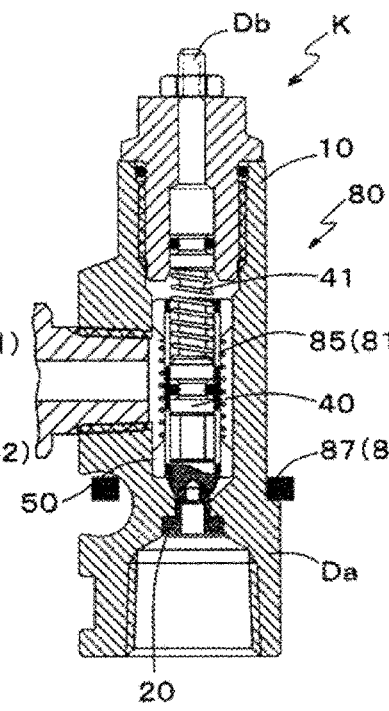
Figure 15C:
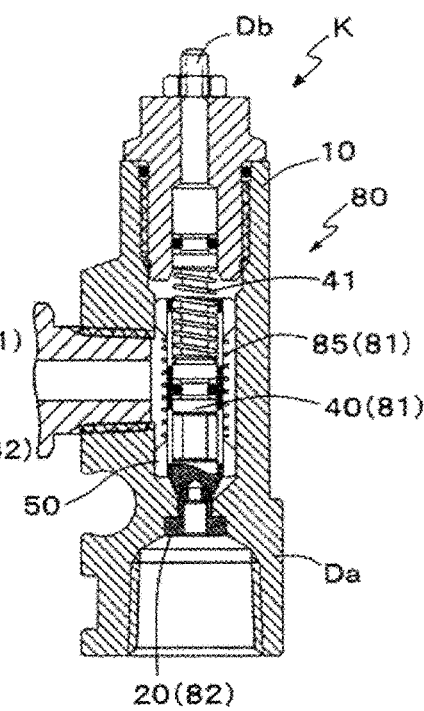

Next, FIGS. 15(*a*), 15(*b*) and 15(*c*) show modified examples of the device for detecting fluid flow. A flow detecting device K shown in FIG. 15(*a*) is substantially analogous to the flow detecting device K shown in FIG. 14. However, the second member 82 is made up of a half-ring-shaped permanent magnet 86 additionally provided on the outside of the body 10. A flow detecting device K shown in FIG. 15(*b*) is substantially analogous to the flow detecting device K shown in FIG. 14. However, the second member 82 is made up of a ring-shaped permanent magnet 87 additionally provided on the outside of the body 10.

A flow detecting device K shown in FIG. 15(*c*) includes the coil 85 as with the flow detecting device K shown in FIG. 14. The first member 81 is made up of the valve member 40 and the coil 85. The second member 82 is made up of the bush 20. The bush 20 is made up of a permanent magnet.

As shown in FIGS. 2 to 5, the device K for detecting fluid flow according to the embodiment includes a body 10 that has a fluid space E having a cylindrical inner surface 11 allowing a fluid to pass therethrough, and is made up of a conductor, such as metal. In the body 10, a fluid supply port 13 having a supply aperture 12 centered on the central axis P of the fluid space E is formed at one end of this fluid space E. One end Ea of the fluid space E is formed in a manner inclined toward the supply aperture 12. A male thread 14 for connection to the lubrication pipeline is formed on an external side of a site where the supply port 13 is formed. A fluid discharge port 16 that has a discharge aperture 15 communicating with the fluid space E is formed on a side of the body 10. The discharge port 16 internally includes a female thread part 17 for connection to the lubrication pipeline 4, and is formed to have an adaptor shape allowing detachable connection to the body 10 by a thread member 18.

Figure 16A:
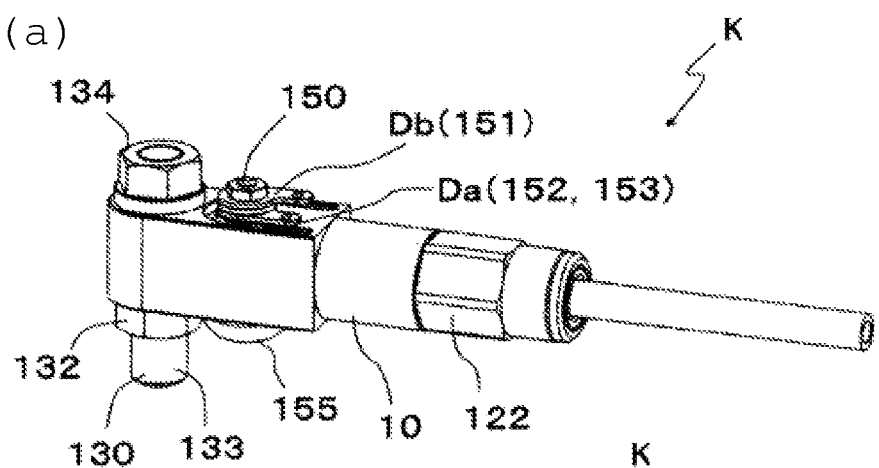
FIGS. 16(a) and 16(b) show a device for detecting fluid flow according to another type of embodiment of the invention.
Figure 16B:
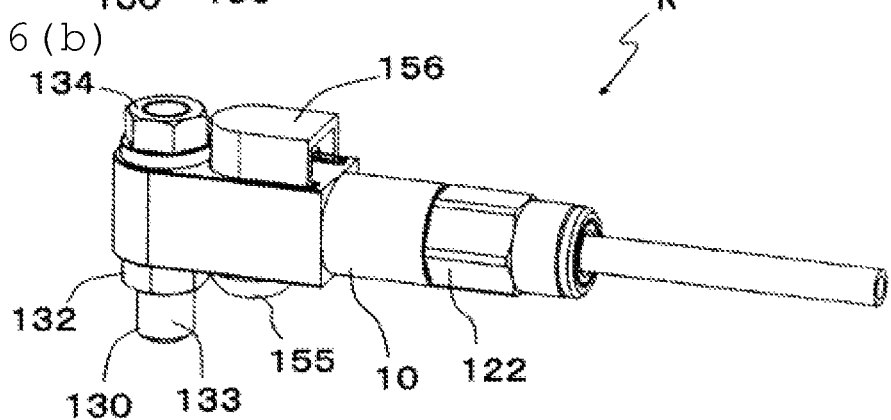
Figure 17:
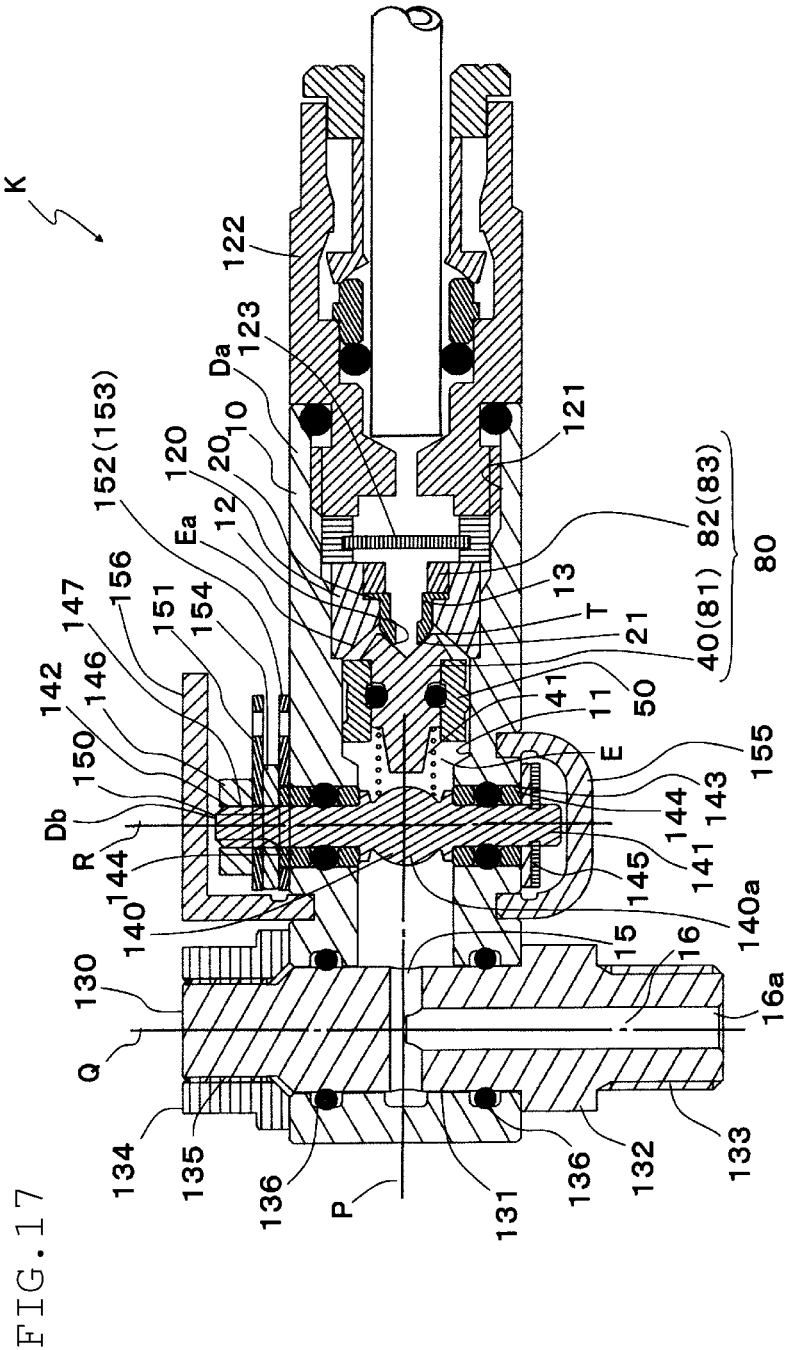
FIG. 17 is a sectional view showing the device for detecting fluid flow according to the other type of embodiment of the invention.

FIGS. 16 and 17 show a device K for detecting fluid flow according to another type of the embodiment of the invention. The flow detecting device K includes a body 10 that has a fluid space E having a cylindrical inner surface 11 allowing a fluid to pass therethrough, and is made up of a conductor, such as metal. A ring-shaped end member 120 constituting the one end Ea of the fluid space E is fitted to the body 10. The bush 20 that is made up of a conductor, such as of metal, and is coaxial with the central axis P of the fluid space E is fitted to the end member 120. In the bush 20, the fluid supply port 13 having the supply aperture 12 centered on the central axis P of the fluid space E is formed. The end of the supply aperture 12 constitutes the aperture edge 21 of the supply aperture 12, the edge being formed tapering in an inclined manner and being arranged in the fluid space E in a protruding manner. A site of the end member 120 that constitutes the one end Ea of the fluid space E is formed inclining toward the supply aperture 12. The ring-shaped permanent magnet 83 is fitted to the end member 120; this magnet constitutes the attracting member 80 analogous to that described above at the position opposite to the supply aperture 12 of the bush 20, and serves as the second member 82 that attracts the valve member 40 serving as the first member 81 described later.

On the inner side of a one end portion of the body 10, a female thread 121 is formed. A connection member 122 for connection with a lubrication pipe is provided to be screwed into the female thread 121. A coin-shaped filter 123 intervenes between the end member 120 and the connection member 122.

A holding rod 130 that holds the body 10, can be relatively rotated about the axis on an axis line Q orthogonal to the central axis P of the fluid space E, and can be locked at a required rotation position, is provided for the body 10 on another side thereof outer than the other electrode Db, described later, in a penetrating manner. In the body 10, a through-hole 131 into which the holding rod 130 is inserted is formed. A one-end part of the holding rod 130 protruding from the body 10 includes a large-diameter part 132 having a larger diameter than the through-hole 131, and a male thread 133 that is formed outer than the large-diameter part 132 and is to be screwed into the lubrication site. On the other-end part of the holding rod 130 protruding from the body 10, a male thread 135 that is screwed into a nut 134 is formed. The holding rod 130 is allowed to be relatively rotated with respect to the body 10 by loosening the nut 134. The holding rod 130 is locked with respect to the body 10 by fastening the nut 134. Reference sign 136 denotes an O-ring that intervenes between the holding rod 130 and the through-hole 131, for sealing.

In the body 10, the fluid discharge port 16, which has discharge apertures 15 communicating with the fluid space E, is formed. Specifically, the discharge ports 16 are formed in the holding rod 130. The discharge apertures 15 of the discharge port 16 are formed at two sites of the holding rod 130 that face the fluid space E. An outlet 16a of the discharge port 16 is formed on a one end face of the holding rod 130.

The body 10 is configured to be one electrode Da that is made up of a conductor and includes a contact T exposed toward one end of the fluid space E. The body 10 is provided with the other electrode Db that is made up of a conductor and is insulated from the one electrode Da. The other electrode Db has an axis on the axis line R orthogonal to the central axis P of the fluid space E, has an exposure part 140 exposed on the other end of the fluid space E, and is formed to have a rod shape where a one-end part 141 and the other-end part 142 protrude from the body 10. An intermediate part of the exposure part 140 is formed to be spherical. That is, the exposure part 140 is formed to include a spherical part 140a with which an end of the coil spring 41, described later, is to be in contact. In the body 10, an insertion hole 143 into which the other electrode Db is inserted is formed. At a site of the other electrode Db that corresponds to the insertion hole 143, a holding member 144 that is made up of an insulator and holds the other electrode Db is provided. The holding member 144 is liquid-tightly fitted to the insertion hole 143.

A fixation ring 145 having a larger diameter than the insertion hole 143 is fitted to the one-end part 141 of the other electrode Db to prevent dropping off. Meanwhile, at the other-end part 142 of the other electrode Db, a male thread 147 to be screwed into the nut 146 is formed. The other electrode Db is fixed to the body 10 by fastening the nut 146. The other-end part 142 of the other electrode Db is formed as a connection part 150, with which a terminal 151 for connection is connected. The connection part 150 of the other electrode Db is provided with a connection part 152 of the one electrode Da in a state of being insulated from the connection part 150. The connection part 152 is made up of a terminal 153 for connection that is contact with the body 10. The terminals 151 and 153 are held between the body 10 and the nut 146 where an insulator 154 intervenes. Reference sign 155 denotes a cover that covers the one-end part 141 of the other electrode Db. Reference sign 156 denotes a cover that covers the other-end part 142 of the other electrode Db, the nut 146, and the terminals 151 and 153. The covers are formed to allow a mold resin to be injected therein.

The fluid space E internally stores: a valve member 40 that is made up of a conductor, such as metal, is moved along the central axis P of the fluid space E, comes into contact with the contact T of the one electrode Da to close the supply aperture 12, and comes apart from the contact T to open the supply aperture 12; and a coil spring 41 that is made up of a conductor, such as metal, is connected to the valve member 40 at one end while being connected to the spherical part 140a of the exposure part 140 of the other electrode Db at the other end, and always urges the valve member 40 in a direction of closing the supply aperture 12. Accordingly, this flow detecting device K can detect the fluid flow by electrically detecting connection when the valve member 40 is closed and disconnection when this member is opened in the electric circuit that includes the one electrode Da, the valve member 40, the coil spring 41 and the other electrode Db.

As described above, as shown in FIGS. 4(a), 4(b) and 4(c), the contact T of the one electrode Da is provided at the aperture edge 12a of the supply aperture 12 and/or the peripheral part 12b of the aperture edge 12a. The peripheral part 12b includes the aperture edge 21 of the bush 20 at the supply aperture 12, and an outer peripheral part 28 that is a part of the one end Ea of the fluid space E outer than the bush 20. The aperture edge 21 of the bush 20 at the supply aperture 12 is formed tapering in an inclined manner, and is formed to protrude into the fluid space E.

Figure 18A:
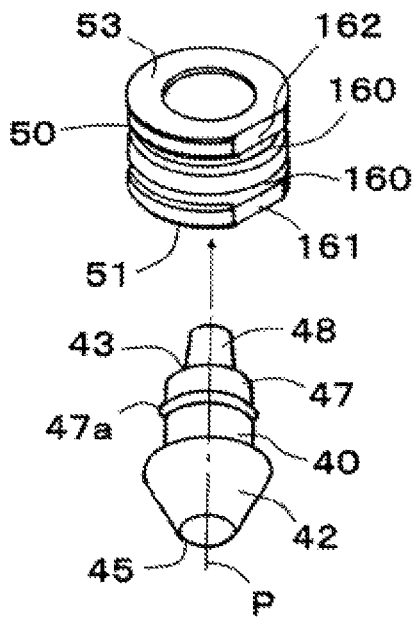
FIGS. 18(a), 18(b), 18(c), 18(d), 18(e), 18(f) and 18(g) show a guide member in the device for detecting fluid flow according to the other type of embodiment of the invention.
Figure 18B:
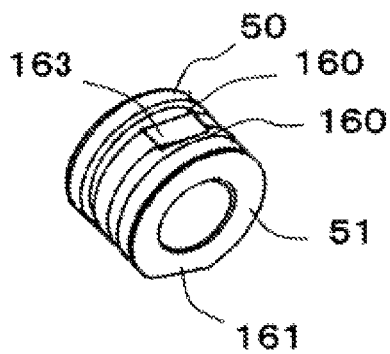
Figure 18D:
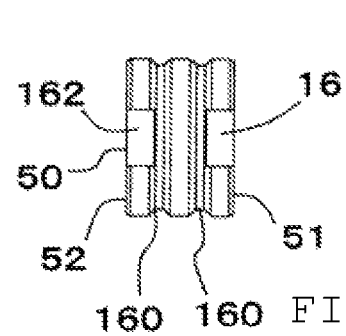
Figure 18C:
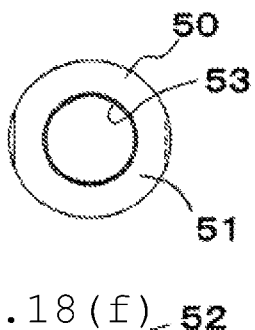
Figure 18E:
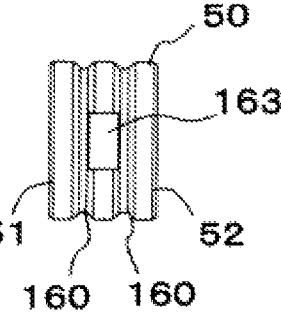
Figure 18F:
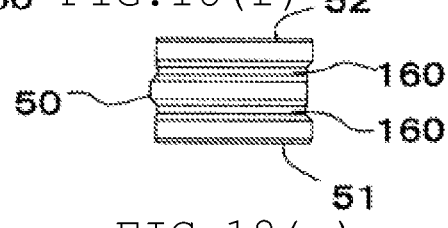
Figure 18G:
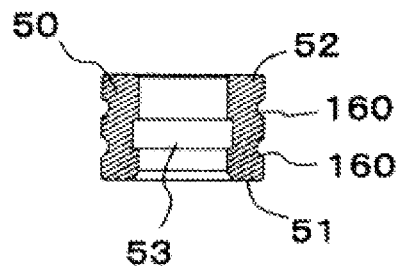

As shown in FIG. 18(a), the valve member 40 is formed to have a rod shape that includes a distal end 42 capable of coming into contact with the contact T to block the supply aperture 12, and has an axis on the axis line along the central axis P of the fluid space E. The valve member 40 includes: a large-diameter part 47 that is nearer to the distal end and to be fitted into an insertion hole 53 of the guide member 50, described later; and a small-diameter part 48 that is nearer to the rear end and is formed narrower than the large-diameter part 47 so as to be inserted into the coil spring 41. One end of the coil spring 41 is held by a step part 43 between the large-diameter part 47 and the small-diameter part 48. The large-diameter part 47 of the valve member 40 is fitted into the insertion hole 53 via the O-ring 47a. The fitting is achieved by the O-ring 47a. Consequently, the valve member 40 can be easily fitted to the guide member 50. The distal end 42 of the valve member 40 is configured to include a depression part 45 that faces the aperture edge 21 at the supply aperture 12 and is depressed inward. The depression part 45 is formed to have a conical shape having an axis on the axis line along the central axis P of the fluid space E. Meanwhile, the aperture edge 21 of the bush 20 at the supply aperture 12 is formed to protrude into the fluid space E so as to face the inside of the depression part 45 when the valve member 40 blocks the supply aperture 12.

Contact with the contact T of the one electrode Da of the valve member 40 is achieved to the peripheral part 12b of the supply aperture 12. As shown in FIG. 4(c), only the inner surface of the depression part 45 of the distal end 42 is in contact with the external surface of the aperture edge 21 of the bush 20.

Figure 4A:
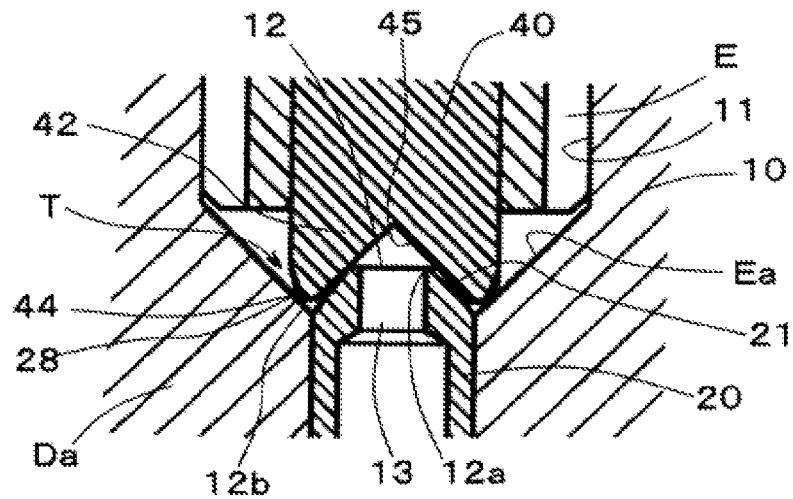
FIGS. 4(a), 4(b) and 4(c) are main part enlarged sectional views showing modes of contact between a valve member and a contact of one electrode in the device for detecting fluid flow according to the embodiment of the invention.
Figure 4B:
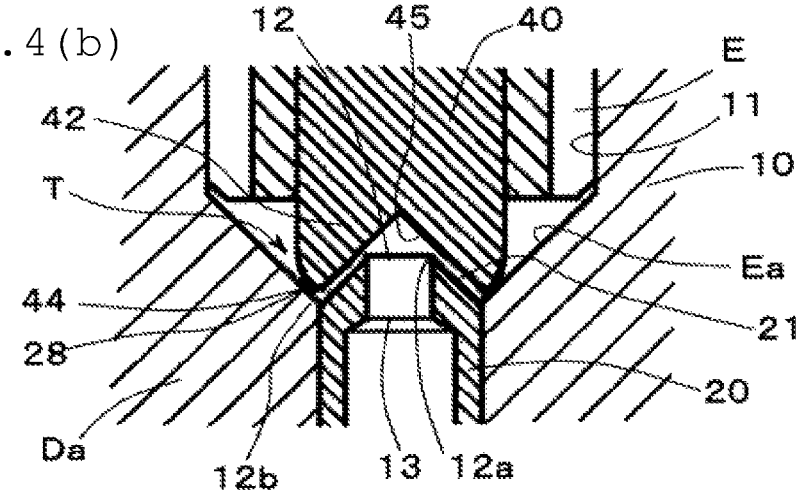
Figure 4C:
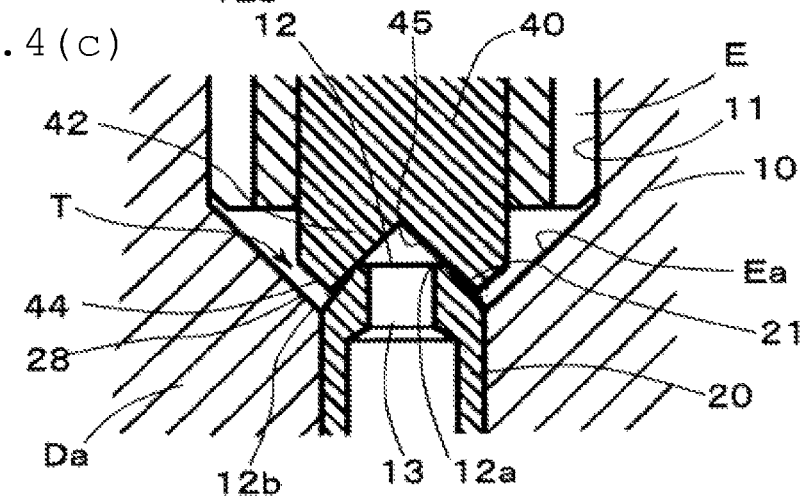

Note that contact of the valve member 40 with the contact T of the one electrode Da may be achieved such that as shown in FIG. 4(a), the inner surface of the depression part 45 of the distal end 42 is in contact with the external surface of the aperture edge 21 of the bush 20, and the peripheral part 44 of the depression part 45 is in contact with the outer peripheral part 28 that is of the one end Ea of the fluid space E and is outer than the aperture edge 21 of the bush 20. For example, as shown in FIG. 4(b), the shape and dimensions of each member may be defined so as to achieve a mode where the peripheral part 44 of the depression part 45 is in contact only with the outer peripheral part 28 that is of the one end Ea of the fluid space E and is outer than the aperture edge 21 of the bush 20.

This flow detecting device K includes the guide member 50 that is made of an insulator, such as resin, and is additionally provided for the valve member 40 and is provided in the fluid space E. As shown in FIGS. 18(a) to 18(g), the guide member 50 is configured to secure the flow path of the fluid from the supply aperture 12 to the discharge aperture 15 while being slidable on the cylindrical inner surface 11 of the fluid space E, has a reception surface 51 facing one end face of the fluid space E while receiving the fluid from the supply aperture 12, and has a top surface 52 facing another end face of the fluid space E. The insertion hole 53 is formed in the guide member 50 in a penetrating manner; this hole has an axis on the axis line along the central axis P of the fluid space E, and the distal end 42 of the valve member 40 is inserted through this hole, with the distal end 42 protruding. Groove-shaped groove paths 160 are formed on the peripheral surface of the guide member 50; the paths have an inlet port 161 at a part of the guide member 50 closer to the one end face of the fluid space E, and an outlet port 162 at a part of the guide member 50 closer to the other end face of the fluid space E, and are along the circumferential direction and allow the fluid to pass therealong. The two groove paths 160 are provided on the peripheral surface of the guide member 50. The groove paths 160 communicate with each other at an intermediate communication path 163.

Consequently, in the fluid flow detecting device K according to the other type of the embodiment, for example, wiring (not shown) is preliminarily connected to the one electrode Da and the other electrode Db. In this case, for example, wiring is preliminarily connected to the terminal 151 and the terminal 153. These terminals 151 and 153, to which the wiring is connected, are mounted on the other electrode Db via the insulator 154, and the nut 146 is screwed onto the male thread 147 to achieve fastening. Accordingly, the other electrode Db is fixed to the body 10. In this case, the other electrode Db is disposed across the fluid space E. Accordingly, the other electrode Db is rotated about the axis on the axis line R orthogonal to the central axis P of the fluid space E, and the contact part with the coil spring 41 is changed. However, as the coil spring 41 is in contact with the spherical part 140a, the coil spring 41 can be always in contact with the spherical surface even when the other electrode Db is rotated. This contact negates the need to adjust the position of the other electrode Db, and can facilitate assembly and facilitate stable connection.

Subsequently, the other-end part 142 of the other electrode Db, the nut 146, the terminal 151, and the terminal 153 are covered with the cover 156, and the mold resin is injected thereinto as required. In this case, the connection parts 150 and 152 of the one electrode Da and the other electrode Db can be provided on the side of the body 10 in an aggregated manner, and the device can be compact accordingly. Both the connection parts 150 and 152 can molded with insulative resin, thereby facilitating protection.

To attach the fluid flow detecting device K according to the other type of the embodiment to the lubrication site, the male thread 133 of the holding rod 130 having discharge port 16 is screwed into the lubrication site. In this case, the nut 134 is loosened to unlock the holding rod 130, and this device is attached, and subsequently the nut 134 is fastened to lock the rod. In this case, even when the holding rod 130 is rotated, the body 10 can be constantly positioned at a certain position. Consequently, the flexibility of attachment at a narrow space is improved, which can facilitate the attachment.

In the case of actual use, in a manner analogous to that described above, the valve member 40 and the guide member 50 move to and fro. In this case, the groove paths 160 are provided along the circumferential direction of the guide member 50. Consequently, the resistance against fluid passage is increased. The valve member 40 can easily float upward accordingly. In particular, this configuration is suitable to a case where the fluid has a low viscosity. The viscosity is low. Accordingly, the fluid flow can be secured. The groove-shaped groove paths 160, which allow the fluid along the circumferential direction to pass therealong, are formed on the peripheral surface of the guide member 50. Consequently, the fluid passes along the circumferential direction of the guide member 50. Consequently, every time the guide member 50 slides on the cylindrical inner surface of the fluid space E, the peripheral surface of the guide member 50 can easily come into contact with new fluid. For example, in a case where the fluid is grease or the like, the adverse possibility of fixation can be eliminated. Other operations and advantageous effects are analogous to those described above.

Figure 19A:
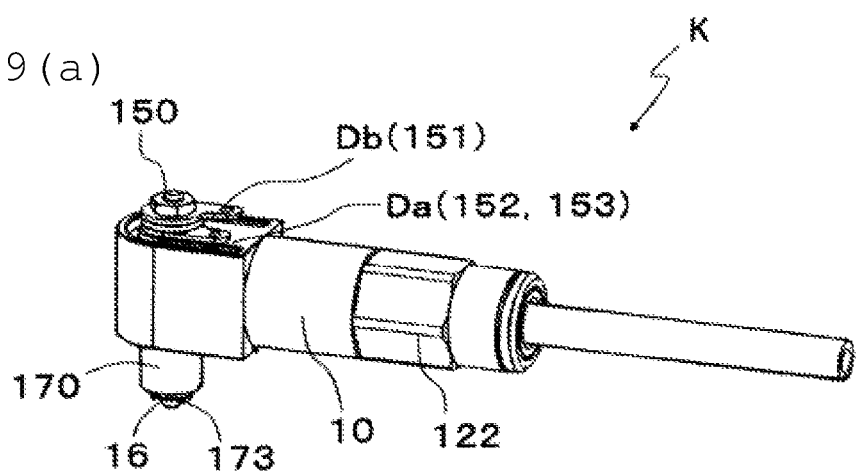
FIGS. 19(a) and 19(b) show a device for detecting fluid flow according to still another type of embodiment of the invention.
Figure 19B:
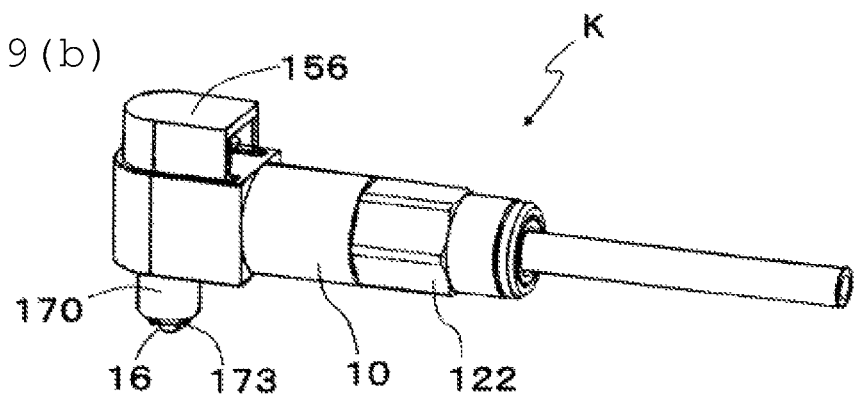
Figure 20:
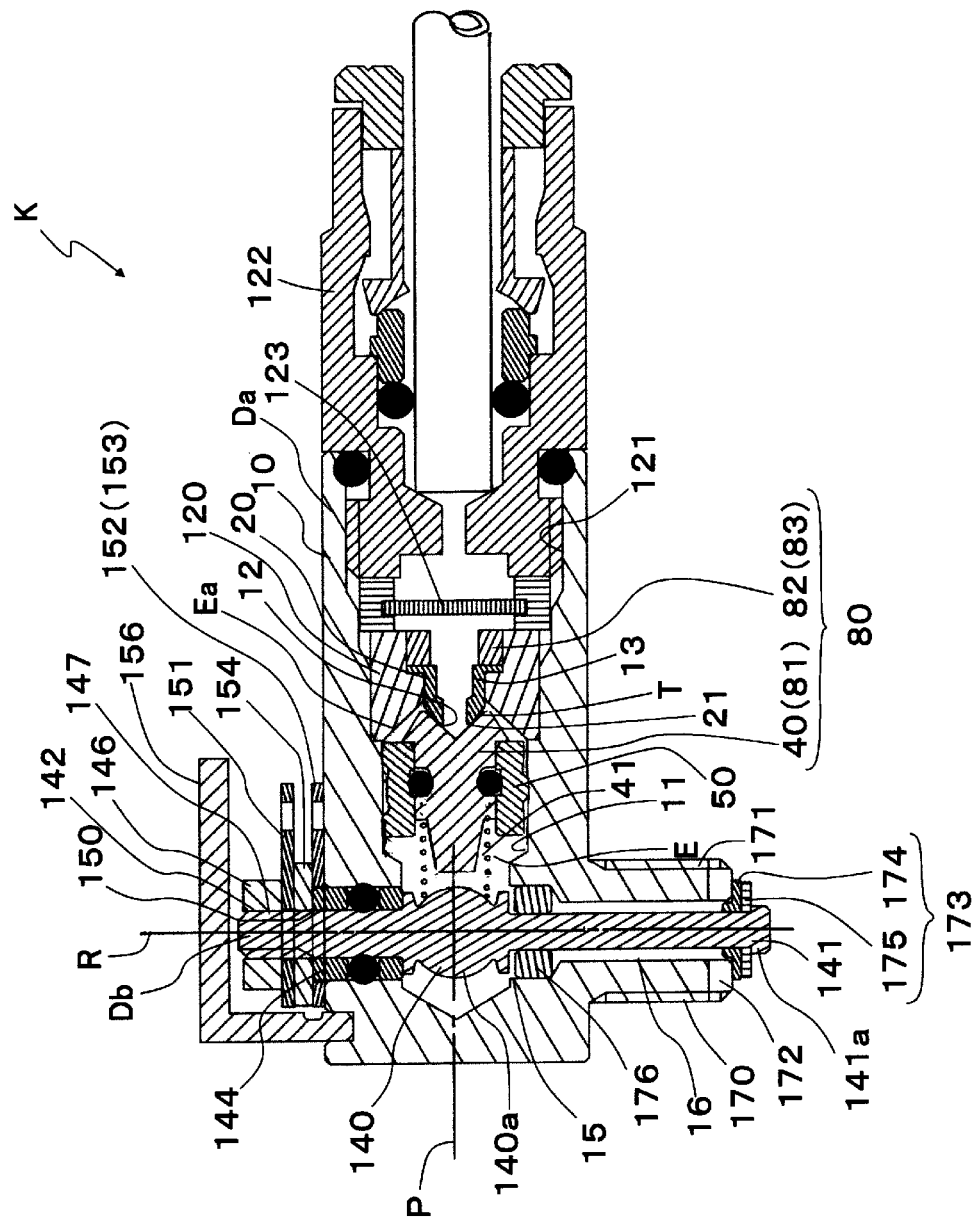
FIG. 20 is a sectional view showing the device for detecting fluid flow according to the still other type of embodiment of the invention.

FIGS. 19 and 20 show a fluid flow detecting device K according to still another type of the embodiment of the invention. The flow detecting device K has a configuration analogous to that described above, but is different from that described above in that the holding rod 130 and the site provided therewith are eliminated, and the discharge port 16 is formed on the side of the body 10 so as to allow the one side of the other electrode Db to be inserted thereinto. A protrusion 170 having an axis on the axis line R orthogonal to the central axis P is formed on the side of the body 10. A male thread 171 that is to be screwed into the lubrication site is formed on the outer periphery of the protrusion 170, and the discharge aperture 15 and the discharge port 16 are formed therein. One end of the other electrode Db protrudes from the discharge port 16, and is formed as a large-diameter part 141a having a larger diameter than the discharge port 16. A groove 172 communicating with the discharge port 16 is formed on the side face of the protrusion 170.

The body 10 is provided with a support member 173 that is made up of an insulator and holds the one end of the other electrode Db while securing a flow path of the fluid. The support member 173 includes: a ring-shaped insulator 174 that is inserted into the one-end part 141 of the other electrode Db, has a larger diameter than the discharge port 16 and is in contact with the end face of the protrusion 170; and a fixation ring 175 that fixes the insulator 174. The insulator 174 and the fixation ring 175 are pressed against the end face of the protrusion 170 with the large-diameter part 141a of the one end face 141 of the other electrode Db by fixing the nut 146. The discharge aperture 15 of the discharge port 16 is provided with another support member 176 having a notch (not shown) formed to encircle the other electrode Da and to allow the fluid to pass therethrough. Accordingly, the discharge port 16 is formed at a site where the one end of the other electrode Db resides. Consequently, in comparison with a case where the discharge port 16 is provided outer than the other electrode Db, the device can be formed compact, and the flexibility of attachment at a narrow space can be improved.

Figure 21:
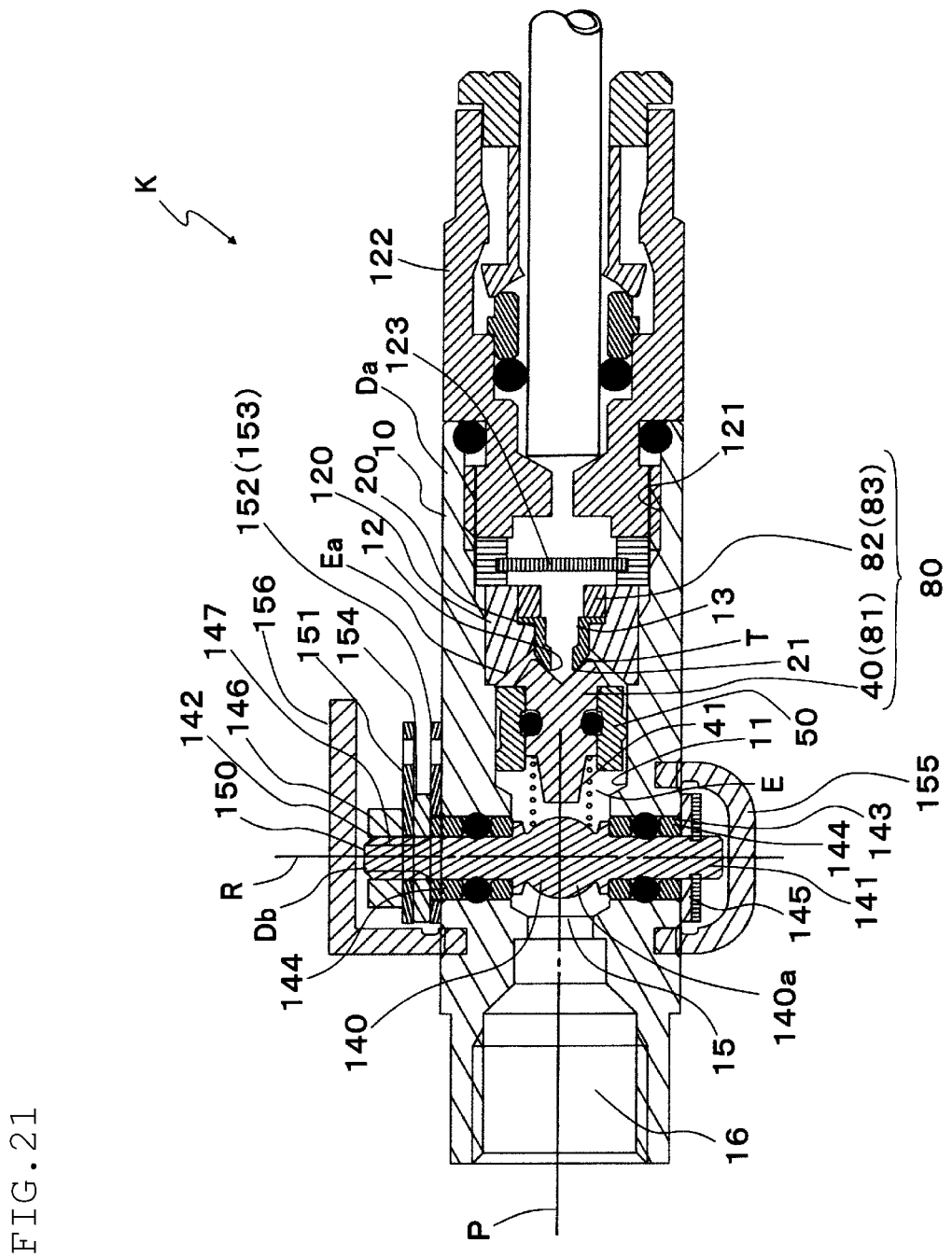
FIG. 21 is a sectional view showing the device for detecting fluid flow according to yet another type of embodiment of the invention.

FIG. 21 shows a device K for detecting fluid flow according to yet another embodiment of the invention. The flow detecting device K has a configuration analogous to that described above, but is different from that described above in that the holding rod 130 and the site provided therewith are eliminated, and the discharge port 16 is formed on the other end of the fluid space E so as to have the discharge aperture 15 centered on the central axis P of the fluid space E. The supply port 13 and the discharge port 16 can be provided on the central axis P of the fluid space E. Consequently, the body 10 can be used in a straightened manner, and the attaching versatility can be improved.

Figure 24A:
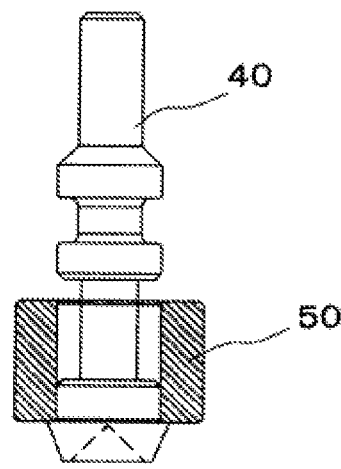
FIGS. 24(a), 24(b) and 24(c) show a configuration of a guide member in a device for detecting fluid flow according to still another embodiment of the invention.
Figure 24B:
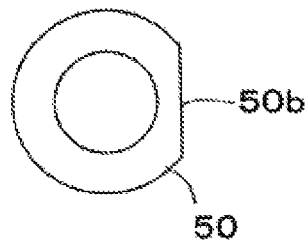
Figure 24C:
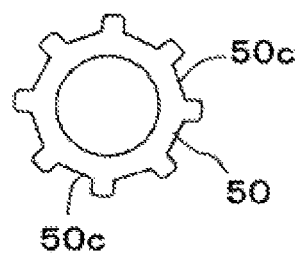
Figure 25:
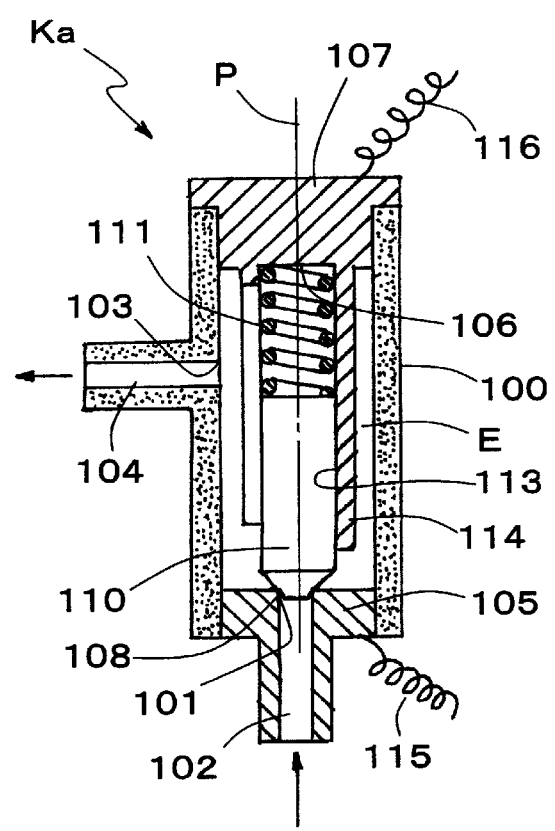
FIG. 25 is a sectional view showing an example of a conventional device for detecting fluid flow.

FIGS. 22 and 23 show a device K for detecting fluid flow according to yet another embodiment of the invention. The basic configuration of the flow detecting device K is analogous to the flow detecting device K shown in FIG. 11, but is different in that the body 10 is made of transparent resin, the one electrode Da is made up of the bush 20, and the guide member 50 is provided only on the distal end of the valve member 40. In detail, as shown in FIGS. 24(a) and 24(b), for example, the guide member 50 may be formed to have a cylindrical shape having one notch 50b that is provided on the outer periphery, is oriented in the axial direction and allows the fluid to pass therethrough. In detail, as shown in FIG. 24(c), the guide member 50 may be formed to have a cylindrical shape having a plurality of notches 50c that are provided on the outer periphery, are in an equiangular relationship, are oriented in the axial direction, and allow the fluid to pass therethrough.

Furthermore, the body 10 is provided with a photosensor 90 that detects opening and closing of the valve member 40. The fluid flow can be detected by the photosensor 90. The photosensor 90 is called a photointerrupter, which is a well-known sensor that includes an optical emitter and an optical receiver facing each other, and senses interruption of light from the optical emitter by an object with the optical receiver, thereby determining the presence or absence and the position of the object. A photosensor 90(A) shown in FIGS. 22(a) and 22(b) are of a reflective type. The guide member 50 is color-coded between white and black in the vertical direction. The opening and closing of the valve member 40 are sensed by recognizing the guide member 50. A photosensor 90(B) shown in FIGS. 23(a) and 23(b) of a reflective type. The guide member 50 is formed to be transparent, which allows the valve member 40 to be recognized.

In the flow detecting device K shown in FIGS. 11 to 23, the combination of the first member 81 and the second member 82 is not limited to that described above, and may be appropriately configured instead. In the flow detecting device K shown in FIGS. 11 to 21, the valve member 40 may be configured to be slidable on the guide member 50 as with the flow detecting device K shown in FIG. 10. The configuration may be appropriately modified.

In the device K for detecting fluid flow according to the embodiment, the one electrode Da and the other electrode Db are not limited to those described above, and may be appropriately modified. Furthermore, in the embodiment described above, a member of detecting opening and closing of the valve member 40 is achieved by the members through the electrodes Da and Db or by the member through the photosensor 90. However, the configuration is not necessarily limited thereto. For example, detection may be achieved by any member, such as a member of detection through an image sensor. The configuration may be appropriately modified. The image sensor is adopted in an optical mouse and the like, and calculates the amount of movement by change of an image. Furthermore, the shapes, sizes, materials and the like of the valve member 40 and the guide member 50 are not limited to those described above. Those skilled in the art can easily, variously modify the exemplified embodiments without substantially departing from the novel teaching and advantageous effects of the invention. These various modifications are covered by the invention.

The literature described in this Description and the Description of Japanese Patent Application based on which the present application claims Paris Convention priority are herein incorporated in its entirety by reference.

REFERENCE SIGNS LIST

K Flow detecting device
S Lubrication system
1 Lubricant pump apparatus
2 Quantitative valve
3 Lubrication site
4 Lubrication pipeline
5 Detector
6, 7 Wiring
10 Body
11 Inner surface
E Fluid space
P Central axis
12 Supply aperture
12a Aperture edge
12b Peripheral part
13 Supply port
15 Discharge aperture
16 Discharge port
20 Bush
Da One electrode
T Contact
21 Aperture edge
Db Other electrode
28 Outer peripheral part
30 Exposure part
31 Connection part
33 Holding member
34 Holding hole
35 Nut
40 Valve member
41 Coil spring
42 Distal end
43 Step part
44 Peripheral edge part
45 Depression part
46 Outer peripheral edge
47 Large-diameter part
48 Small-diameter part
50 Guide member
51 Reception surface
52 Top surface
53 Insertion hole
54 narrow part
55 One-end slider
55a One-end slide surface
56 Other-end slider
56a Other-end slide surface
57 One-end notch
58 Other end notch
59 Communication path
50a Guide member 53a Slide hole
60 Large-diameter part
61 Small-diameter part
62 Small-diameter part
63 Step part
64 O-ring
70 Communication path
71 Communication path
80 Attracting member
81 First member
82 Second member
83 Permanent magnet
83a Internal permanent magnet
83b External permanent magnet
85 Coil
86 Permanent magnet
87 Permanent magnet
90 Photosensor
91 Adaptor (one electrode Da)
92 Coil
120 End member
122 Connection member
123 Filter
130 Holding rod
Q Axis line
131 Through-hole
134 Nut
R Axis line
140 Exposure part
140a Spherical part
141 One-end part
142 Another-end part
143 Insertion hole
144 Holding member
145 Fixation ring
146 Nut
150 Connection part
151 Terminal for connection
152 Connection part
153 Terminal for connection
160 Groove path
170 Protrusion
173 Support member
176 Support member

The invention claimed is:

1. A device for detecting fluid flow, comprising:
a body having a fluid space that allows fluid to pass therethrough and has a cylindrical inner surface, wherein the body is provided with a fluid supply port that has a supply aperture centered on a central axis of the fluid space and is formed at one end of the fluid space, and the body is provided with a fluid discharge port that has a discharge aperture communicating with the fluid space,
a valve member made of a conductor and stored in the fluid space, the valve member being moved along the central axis of the fluid space, closing the supply aperture, and coming apart from the supply aperture to open the supply aperture,
a coil spring stored in the fluid space, the coil spring always urging the valve member in a direction of closing the supply aperture, so that the device is capable of detecting the fluid flow by sensing opening and closing of the valve member, and
a guide member made of an insulator and attached onto the valve member, the guide member being formed separately from the valve member to secure a flow path of the fluid from the supply aperture to the discharge aperture while being slidable on the cylindrical inner surface of the fluid space, the guide member having a reception surface facing one end face of the fluid space while receiving the fluid from the supply aperture, and having a top surface facing another end face of the fluid space.

2. The device for detecting fluid flow according to claim 1,
wherein the valve member is formed to have a rod shape that includes a distal end capable of blocking the supply aperture, and has an axis on an axis line along the central axis of the fluid space,
the guide member has an insertion hole which has an axis on the axis line along the central axis of the fluid space and into which the valve member is inserted therethrough with the distal end protruding therefrom,
a narrow part is formed on an outer periphery of an intermediate part of the guide member, the narrow part allowing the fluid to pass therethrough along a circumferential direction,
a part of the guide member close to the one end face of the fluid space is configured to be a one-end slider that includes the reception surface, and includes a one-end slide surface slidable on the cylindrical inner surface of the fluid space,
a part of the guide member close to the another-end face of the fluid space is configured to be another-end slider that includes the top surface, and includes another-end slide surface slidable on the cylindrical inner surface of the fluid space,
a one-end notch is formed on an outer side of the one-end slider, the one-end notch ranging between the reception surface and the narrow part and allowing the fluid to pass therethrough, and
another-end notch is formed on an outer side of the another-end slider, the another-end notch ranging between the top surface and the narrow part and allowing the fluid to pass therethrough.

3. The device for detecting fluid flow according to claim 2,
wherein a plurality of the one-end notches are provided, the one-end notches are each formed to have an identical size and have an identical shape, and are arranged about the axis line at regular angular intervals,
a plurality of the another-end notches are provided, and the another-end notches are each formed to have an identical size and have an identical shape, and are arranged about the axis line at regular angular intervals.

4. The device for detecting fluid flow according to claim 2,
wherein the insertion hole is formed in the guide member to penetrate therethrough,
the valve member is configured to have a large-diameter part fitted onto the insertion hole, and a small-diameter part formed to be narrower than the large-diameter part, and
a plurality of communication paths communicating with the insertion hole are formed at sites of the guide member, the sites corresponding to the small-diameter part of the valve member and at least being at any of the narrow part, the one-end notches, and the another-end notches.

5. The device for detecting fluid flow according to claim 4, wherein the small-diameter part is provided close to a rear end of the valve member, and one end of the coil spring is stored in the insertion hole, and the plurality of communication paths are formed at sites of the guide member where the narrow part and/or the another-end notch of the guide member reside.

6. The device for detecting fluid flow according to claim 5, wherein the large-diameter part of the valve member is provided at a middle of the valve member, the small-diameter part is provided between the distal end and the large-diameter part of the valve member, and the plurality of communication paths are formed at sites of the guide member that correspond to the small-diameter part and are the narrow part and/or the one-end notch.

7. The device for detecting fluid flow according to claim 6, wherein an O-ring is arranged around the large-diameter part, the O-ring being elastically in contact with the inner surface of the insertion hole, and the large-diameter part is inserted into the insertion hole via the O-ring.

8. The device for detecting fluid flow according to claim 1, wherein a groove-shaped groove path is formed on a peripheral surface of the guide member, the groove path having an inlet port at a part of the guide member closer to the one end face of the fluid space, and an outlet port at a part of the guide member closer to the another-end face of the fluid space, the groove path being along a circumferential direction and allowing the fluid to pass therealong.

9. The device for detecting fluid flow according to claim 1, wherein the valve member is configured to include a distal end capable of blocking the supply aperture, and the distal end is configured to include a depression part facing the supply aperture and being depressed inward.

10. The device for detecting fluid flow according to claim 9, wherein the depression part is formed to have a conical shape having an axis on the axis line along the central axis of the fluid space.

11. The device for detecting fluid flow according to claim 9, wherein an aperture edge of the supply aperture is formed to protrude into the fluid space so that the aperture edge can face an inside of the depression part when the supply aperture of the valve member is blocked.

12. The device for detecting fluid flow according to claim 1, the body is provided with one electrode that is made up of a conductor and has a contact exposed at one end of the fluid space, the body is provided with another electrode that is made up of a conductor, has an exposure part exposed at another end of the fluid space, and is insulated from the one electrode, the valve member made up of the conductor is stored in the fluid space, the valve member being moved along the central axis of the fluid space, coming into contact with the contact of the one electrode to close the supply aperture, and coming apart from the contact to open the supply aperture, the coil spring made up of a conductor is stored in the fluid space, the coil spring being connected to the valve member at one end while being connected to the exposure part of the another electrode at the another end, and always urging the valve member in the direction of closing the supply aperture, and the fluid flow is allowed to be detected by electrically sensing connection when the valve member is closed and disconnection when the valve member is opened in an electric circuit that includes the one electrode, the valve member, the coil spring, and the another electrode.

13. The device for detecting fluid flow according to claim 12, wherein the contact of the one electrode is provided at an aperture edge of the supply aperture and/or a peripheral part of the aperture edge, and the valve member is formed to have a rod shape that includes a distal end capable of coming into contact with the contact to block the supply aperture, and has an axis on an axis line along the central axis of the fluid space.

14. The device for detecting fluid flow according to claim 12, wherein the another electrode has an axis on the axis line along the central axis of the fluid space, has one end formed as an exposure part exposed on the other end face of the fluid space, and has another end formed to have a rod shape formed as a connection part protruding from the body, the body is provided with a holding member that is made up of an insulator and holds the another electrode, and the holding member is provided with a holding hole which has an axis on the axis line along the central axis of the fluid space, and which the exposure part of the another electrode internally face, and which stores the another end of the coil spring, and holds the connection part while allowing this connection part to protrude.

15. The device for detecting fluid flow according to claim 14, wherein the holding member is detachably attached to the body.

16. The device for detecting fluid flow according to claim 12, wherein the another electrode has an axis on an axis line orthogonal to the central axis of the fluid space, has an exposure part exposed on the another end of the fluid space, and has an end formed to have a rod shape formed as a connection part protruding from the body, the body is provided with a holding member that is made up of an insulator and holds the another electrode, and the connection part of the another electrode is provided with a connection part of the one electrode in a state of being insulated from the connection part of the another electrode.

17. The device for detecting fluid flow according to claim 16, wherein the exposure part is formed to include a spherical part with which the another end of the coil spring is contact.

18. The device for detecting fluid flow according to claim 16, wherein a holding rod that holds the body, can be relatively rotated about an axis on an axis line orthogonal to the central axis of the fluid space, and can be locked at a required rotation position, is provided for the body outer than the another electrode in a penetrating manner, and the discharge port is formed in the holding rod.

19. The device for detecting fluid flow according to claim 16,
wherein the discharge port is formed in the body in a manner allowing the one end of the another electrode to be movably inserted therein, and
the body is provided with a support member that is made up of an insulator, and holds the end of the other electrode while securing a flow path of the fluid.

20. The device for detecting fluid flow according to claim 16,
wherein the discharge port is formed to have a discharge aperture centered on the central axis of the fluid space, at the another end of the fluid space.

21. The device for detecting fluid flow according to claim 1,
wherein the body is additionally provided with a photosensor that senses opening and closing of the valve member, and
the fluid flow can be detected by the photosensor.

22. The device for detecting fluid flow according to claim 1,
wherein the body is additionally provided with an image sensor that senses opening and closing of the valve member, and
the fluid flow can be detected by the image sensor.

* * * * *